(12) United States Patent
Campbell et al.

(10) Patent No.: US 10,800,608 B1
(45) Date of Patent: Oct. 13, 2020

(54) OPTIMIZED SHIPMENT TRANSFER

(71) Applicant: Amazon Technologies, Inc., Seattle, WA (US)

(72) Inventors: Stephen T. Campbell, Waban, MA (US); Robert M Whitten, Billerica, MA (US); Shilpi Gupta, Somerville, MA (US); Ibolya Horvath, Pembroke, NH (US); Oksana Mikhailovna Kharchenko, Cambridge, MA (US); Justina Lakinger, Charlestown, MA (US); Ryan Clarke, Haverhill, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/429,755

(22) Filed: Jun. 3, 2019

(51) Int. Cl.
*B65G 1/06* (2006.01)
*B65G 67/08* (2006.01)
*B65G 67/24* (2006.01)

(52) U.S. Cl.
CPC ............... *B65G 1/06* (2013.01); *B65G 67/08* (2013.01); *B65G 67/24* (2013.01); *B65G 2201/0235* (2013.01); *B65G 2209/04* (2013.01); *B65G 2812/02168* (2013.01)

(58) Field of Classification Search
CPC ........... B65G 1/06; B65G 67/08; B65G 67/24
USPC ........ 700/214, 228, 230; 198/349, 358, 435; 193/35 MD
See application file for complete search history.

(56) References Cited

U.S. PATENT DOCUMENTS

| | | | | |
|---|---|---|---|---|
| 7,331,471 B1* | 2/2008 | Shakes | ................... | B07C 7/005 |
| | | | | 209/630 |
| 7,516,848 B1* | 4/2009 | Shakes | ..................... | B07C 5/38 |
| | | | | 209/34 |
| 8,560,461 B1* | 10/2013 | Tian | ..................... | G06Q 10/087 |
| | | | | 705/332 |
| 8,612,050 B2* | 12/2013 | Lee | ........................ | B65B 35/44 |
| | | | | 198/411 |
| 8,731,708 B2* | 5/2014 | Shakes | .................. | G06Q 10/08 |
| | | | | 700/216 |
| 9,230,233 B1* | 1/2016 | Sundaresan | ........ | G06Q 10/0832 |
| 10,023,393 B2* | 7/2018 | Brazeau | ................ | B25J 9/1664 |
| 10,043,699 B2* | 8/2018 | Li | ........................ | B65G 1/0464 |
| 10,246,258 B2* | 4/2019 | Lisso | .................... | B65G 17/00 |
| 10,310,472 B2* | 6/2019 | Matergia | ............. | G05B 19/056 |

(Continued)

*Primary Examiner* — Douglas A Hess
(74) *Attorney, Agent, or Firm* — Lee & Hayes, P.C.

(57) ABSTRACT

With respect to a transfer facility configured to optimize package transfers therethrough, a container housing packages may be delivered to a first floor of the transfer facility. The packages may be transported to consolidation stations based on destinations associated therewith. In some examples, the packages may be bound for a single destination and thus transported to a single consolidation station. In some examples, the packages may be bound for multiple destinations and thus transported to a second floor of the transfer facility for sortation. A destination and mode of transportation associated with the package may be determined at an induction station on the second floor, as well as a consolidation station associated therewith. A drive unit may insert the package into a chute for transit down a slide to the consolidation station, where it may be placed into another container for shipment to the destination via the mode of transportation.

20 Claims, 13 Drawing Sheets

(56) References Cited

U.S. PATENT DOCUMENTS

| | | | |
|---|---|---|---|
| 10,450,139 B2* | 10/2019 | Friedl | B65G 1/045 |
| 10,611,021 B2* | 4/2020 | Wagner | B07C 5/36 |
| 10,625,952 B1* | 4/2020 | Luthra | B65G 43/08 |

* cited by examiner

900

```
┌─────────────────────────────────────────────────────────────┐
│ DETERMINE THAT A FIRST CONTAINER AT A FIRST LOCATION ON A   │
│ FIRST FLOOR OF A TRANSFER FACILITY INCLUDES A PLURALITY OF  │
│         PACKAGES BOUND FOR A PLURALITY OF DESTINATIONS      │
│                             902                             │
└─────────────────────────────────────────────────────────────┘
                              ↓
┌─────────────────────────────────────────────────────────────┐
│ DELIVER THE FIRST CONTAINER TO A SECOND LOCATION ASSOCIATED │
│   WITH A CONVEYOR CONFIGURED TO DELIVER PACKAGES FROM THE   │
│    FIRST FLOOR TO A SECOND FLOOR OF THE TRANSFER FACILITY   │
│                             904                             │
└─────────────────────────────────────────────────────────────┘
                              ↓
┌─────────────────────────────────────────────────────────────┐
│   DELIVER A PACKAGE OF THE PLURALITY OF PACKAGES TO THE     │
│                 SECOND FLOOR VIA THE CONVEYOR               │
│                             906                             │
└─────────────────────────────────────────────────────────────┘
                              ↓
┌─────────────────────────────────────────────────────────────┐
│ DELIVER THE PACKAGE TO AN INDUCTION STATION LOCATED ON THE  │
│  SECOND FLOOR, WHEREIN A COMPUTING DEVICE AT THE INDUCTION  │
│   STATION IS CONFIGURED TO DETERMINE A DESTINATION          │
│                 ASSOCIATED WITH THE PACKAGE                 │
│                             908                             │
└─────────────────────────────────────────────────────────────┘
                              ↓
┌─────────────────────────────────────────────────────────────┐
│ IDENTIFY A CHUTE ASSOCIATED WITH THE DESTINATION, WHEREIN   │
│  THE CHUTE CORRESPONDS TO A CONSOLIDATION STATION CONFIGURED│
│   FOR CONSOLIDATING PACKAGES INTO CONTAINERS BOUND FOR THE  │
│                          DESTINATION                        │
│                             910                             │
└─────────────────────────────────────────────────────────────┘
                              ↓
┌─────────────────────────────────────────────────────────────┐
│   CAUSE A FIRST DRIVE UNIT TO DELIVER THE PACKAGE TO THE    │
│             CONSOLIDATION STATION VIA THE CHUTE             │
│                             912                             │
└─────────────────────────────────────────────────────────────┘
                              ↓
┌─────────────────────────────────────────────────────────────┐
│ DETERMINE THAT THE PACKAGE IS ASSOCIATED WITH A SECOND      │
│           CONTAINER BOUND FOR THE DESTINATION               │
│                             914                             │
└─────────────────────────────────────────────────────────────┘
                              ↓
┌─────────────────────────────────────────────────────────────┐
│      DETERMINE THAT THE SECOND CONTAINER IS AT CAPACITY     │
│                             916                             │
└─────────────────────────────────────────────────────────────┘
                              ↓
┌─────────────────────────────────────────────────────────────┐
│ DELIVER THE SECOND CONTAINER TO A LOADING STATION VIA AT    │
│ LEAST ONE OF A BALL DECKING, A ROLLER DECKING, A SECOND     │
│           DRIVE UNIT, OR A HUMAN OPERATED VEHICLE           │
│                             918                             │
└─────────────────────────────────────────────────────────────┘
```

DETERMINE THAT A FIRST CONTAINER CONFIGURED FOR A FIRST MODE OF TRANSPORTATION AT A FIRST LOCATION ON A FIRST FLOOR OF A TRANSFER FACILITY INCLUDES A PLURALITY OF PACKAGES TO BE TRANSPORTED TO A DESTINATION VIA A SECOND MODE OF TRANSPORTATION
1002

IDENTIFY A CONSOLIDATION STATION ASSOCIATED WITH THE DESTINATION AND THE SECOND MODE OF TRANSPORTATION
1004

DELIVER THE FIRST CONTAINER TO THE CONSOLIDATION STATION VIA AT LEAST ONE OF A BALL DECKING, A ROLLER DECKING, A DRIVE UNIT, OR A HUMAN OPERATED VEHICLE
1006

DETERMINE THAT AT LEAST A PORTION OF THE PLURALITY OF PACKAGES HAVE BEEN PLACED INTO A SECOND CONTAINER CONFIGURED FOR THE SECOND MODE OF TRANSPORTATION
1008

DETERMINE THAT THE SECOND CONTAINER IS AT CAPACITY
1010

DELIVER THE SECOND CONTAINER TO A LOADING STATION VIA THE AT LEAST ONE OF THE BALL DECKING, THE ROLLER DECKING, THE DRIVE UNIT, OR THE HUMAN OPERATED VEHICLE
1012

FIG. 10

OPTIMIZED SHIPMENT TRANSFER

BACKGROUND

A significant number of goods are purchased via ecommerce for delivery directly to a consumer. Oftentimes, the goods must travel great distances via air, such as on a cargo airplane, and ground, such as via a semi-trailer truck. Both cargo airplanes and semi-trailer trucks are capable of carrying a large amount of goods, often bound for multiple destinations. Because of the large number of packages bound for multiple destinations, transferring loads from air-to-ground and ground-to-air can be a cumbersome process requiring significant resources. Conventional transfer facility systems manually process packages, such as by utilizing human powered trucks to move pallets transferring goods from air-to ground and vice versa. However, human powered trucks are inefficient to operate because of the vast amount of space required to safely maneuver within the confines of a transfer facility. Thus, the number of pallets, and therefore the total number of packages capable of safely being moved through a traditional transfer facility is limited.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of an example process for transferring packages from a multi-destination container to a single destination container for transportation to a destination.

FIG. 10 illustrates a flow diagram of an example process for transferring packages from a first single-destination container configured for a first mode of transportation to a second single destination container for transportation to a destination via a second mode of transportation.

DETAILED DESCRIPTION

Figure 1:
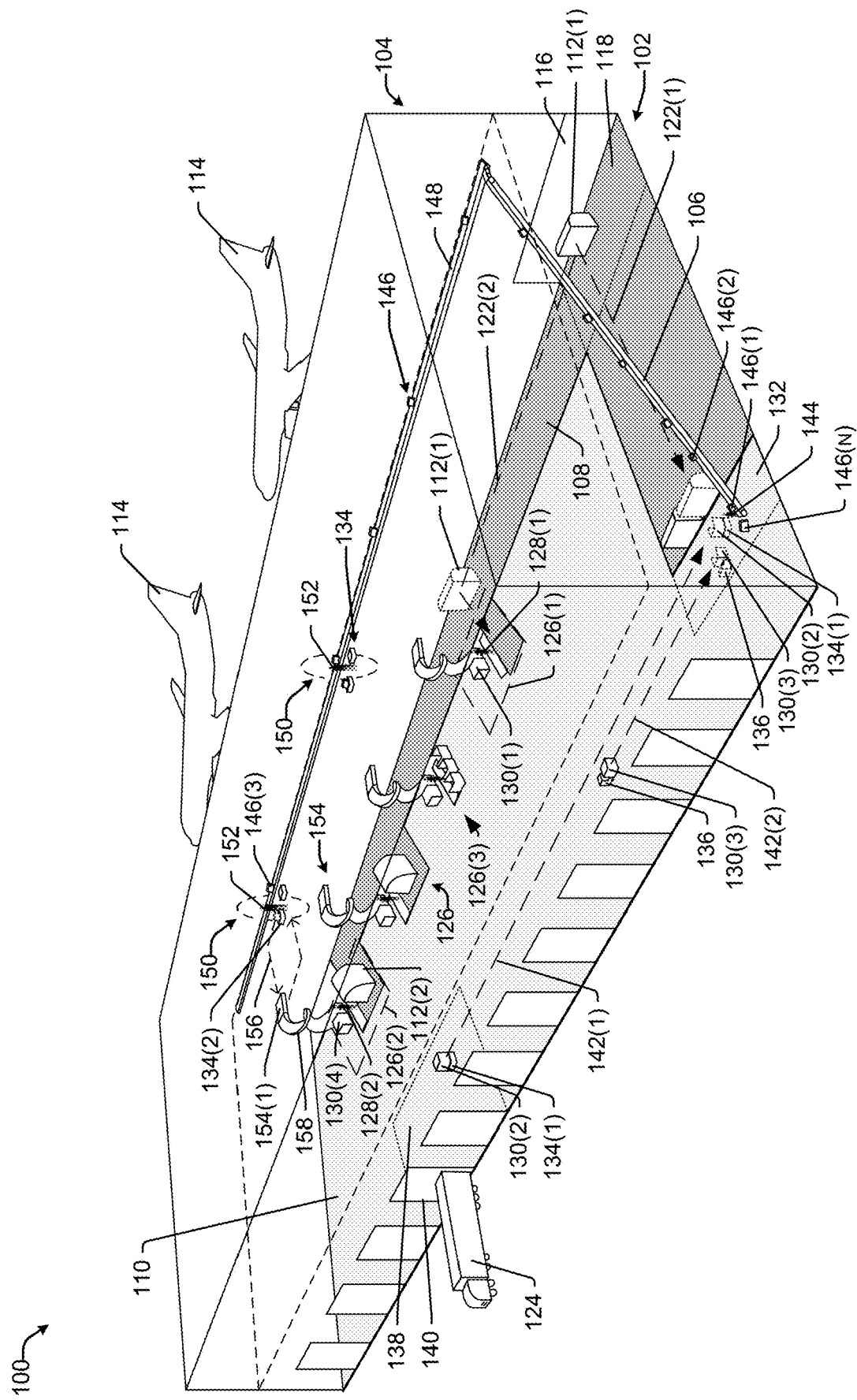
FIG. 1 illustrates an example transfer facility configured with an optimized package transfer system.

This application describes systems and techniques for optimizing the transfer of goods through an improved transfer facility. The techniques described herein may maximize a number of packages capable of being processed through the transfer facility, such as a facility configured for air-to-ground, ground-to-air, ground-to-ground, and air-to-air shipment transfers. The increased throughput of the transfer facility described herein may include a significant improvement over traditional transfer facilities that are limited in a number of packages that may be safely transferred therethrough, such as due to the constraints described above.

The improved transfer facility ("transfer facility") may include a first floor (or a "ground floor") and a second floor connected via one or more conveyor systems (e.g., belt conveyors, vertical conveyors, powered roller conveyors, etc.). The one or more conveyor systems may be configured to carry packages from the first floor to the second floor (first to second floor conveyor(s)). The packages may include those delivered via air, such as in a unit load device (ULD) or other container configured for air cargo (e.g., air freight), and those delivered via ground, such as in a ground shipment container (e.g., cardboard, metal, plastic container, pallets, etc.). In various examples, the packages may be offloaded from the ULDs and/or ground shipment containers and placed directly on the first to second floor conveyor(s) for movement from the first floor to the second floor.

In some examples, the transfer facility may include multiple conveyor systems situated on the second floor, such as to move packages to different locations on the second floor. The second floor may include multiple package processing stations (e.g., induction stations), each with a package processor. The package processor may include a human package processor and/or a robotic package processor. In various examples, the package may be delivered to the induction station via the conveyor system(s). In some examples, the package may be delivered to the induction station via a drive unit or other vehicle configured to move one or more packages across the second floor from the first to second floor conveyor.

The package processor may receive the package and determine a destination associated with the package. The destination may include a final destination (e.g., delivery address) and/or an intermediate destination (e.g., next shipment facility) for the package. The package processor may determine the destination based on a label (e.g., address label, bar code, quick reference (QR) code, etc.) located on the package. In some examples, the package processor may scan the label to determine the destination, such as via a scanner coupled to a computing device. In various examples, the package processor may determine a mode of transportation to the destination, such as via air or ground. In such examples, the mode of transportation to the destination may be included in the label, such as in data encoded in a QR code and/or bar code. In various examples, the computing device may receive destination information from a centralized load planning system (e.g., centralized load planner). In such examples, the centralized load planning system may be configured to manage operations of the packages through the transfer facility. In some examples, the destination information received from the centralized load planner may be presented on a display of the computing device for viewing by the package processor.

In various examples, the package processor may determine a consolidation station associated with the destination and/or the mode of transportation. In some examples, the package processor may identify a chute that corresponds to the consolidation station. The chute may include an opening through the second floor coupled to a slide to carry the package from the second floor to the consolidation station on the first floor. The consolidation station may be configured to receive packages from the chute (i.e., from the second floor) via the slide and consolidate the packages in containers for shipment via air and/or ground. For example, a package processor may receive a package via a conveyor system, scan a label on the package, and determine that the package is destined for Boston via air cargo. The package processor may determine that a particular chute on the second floor corresponds to a particular consolidation station on the first floor that is consolidating packages bound for Boston via air cargo.

In various examples, the package processor may place the package on a drive unit for delivery to the chute. In some examples, the package processor may program the drive unit to deliver the package to the chute. In such examples, the package processor may input an identification associated with the chute (e.g., identification number, name, or the like), the package destination, and/or mode of transportation thereto. In some examples, the drive unit may be configured to communicate with the computing system at the package processing station. In such examples, the computing system may transmit data associated with the chute to the drive unit, such as based on the scanned label on the package.

The drive unit may be configured to transit across the second floor from the package processing station to the designated chute. Based on a determination of arrival at the designated chute, the drive unit may release the package into the chute. The package may travel down the slide to the corresponding consolidation station. A package consolidator at the consolidation station may receive the package at the base of the slide and may place the package into a container for delivery to the destination. In various examples, the consolidation station may be configured to receive packages bound for a particular destination via a particular means of delivery (e.g., air or ground). In such examples, the package consolidator may receive the package and place the package directly into a corresponding container for the particular means of delivery. For example, a consolidation station may be configured to receive packages bound for Los Angeles via air cargo. The package consolidator may receive the packages via the slide and place them into a ULD bound for Los Angeles.

In some examples, the consolidation station may be configured to receive packages for a particular destination via multiple modes of transportation, such as air and cargo. In such examples, the package consolidator may receive a package delivered via the chute from the second floor and may determine a mode of transportation for the package. In some examples, the package consolidator may scan a label on the package to determine the mode of transportation. Based on a determination that the package is to be transported to the destination via air, the package consolidator may place the package into a ULD or other container configured for air cargo. Based on a determination that the package is to be transported to the destination via ground, the package consolidator may place the package into a ground shipment container (e.g., cardboard, metal, plastic, etc.). For example, a consolidation station may be configured to receive packages bound for Dallas via both air and ground. The package consolidator may receive each package via the slide, determine the mode of transportation, and place each package in the corresponding ULD or ground shipment container bound for Dallas.

In various examples, the package consolidator may scan the label associated with each package prior to placing the packages into the ULD and/or ground shipment container. In such examples, a consolidation computing device may track the number, contents, weights, and the like of packages placed in the ULD and/or ground shipment container. The package consolidator may fill the ULD and/or ground shipment container at the consolidation station to capacity. A determination of container capacity may be based on a lack of space remaining in the container (or a volume of the packages currently included in the container), a number of packages included in the container, a duration in which packages have been placed in the container, and/or a weight of the container. In some examples, the package consolidator may fill the ULD and/or ground shipment container until a designated time for shipment. The designated time for shipment may be based on a scheduled departure time of a cargo airplane and/or semi-trailer truck. In some examples, the designated time for shipment may include a threshold amount of time prior to a departure from the transfer facility. For example, the package consolidator may fill a ULD with packages bound for Seattle until one hour prior to a cargo airplane bound for Seattle is due to depart.

In various examples, the consolidation computing device may send a notification that the ULD and/or ground shipment container is at capacity to a centralized load planner. In some examples, the notification may be sent based on an input by the package consolidator that the container is full (e.g., at capacity). In some examples, the package consolidator may receive a notification from the centralized load planner via the consolidation computing device that the ULD and/or ground shipment container is at capacity. In such examples, the centralized load planner may monitor a weight, volume, and/or number of packages in the ULD and/or ground shipment container and may determine that the ULD and/or ground shipment container is at capacity. In some examples, the package consolidator may receive a notification from the centralized load planner via the consolidation computing device that the designated time for shipment is approaching and/or has arrived. Responsive to the notification about the designated time for shipment, the package consolidator may secure the ULD and/or ground shipment container for transportation.

The ULD may be moved across the first floor of the storage facility via ball decking, caster decking, and/or roller decking. The ball decking, caster decking, and/or roller decking may comprise a first portion of the surface of the first floor. The ball decking, caster decking, and/or roller decking may include manual, powered, semi-automatic, and/or automatic systems. In some examples, an air cargo operator, such as a person or a robot may move the ULD across the ball decking, caster decking, and/or roller decking to a designated air cargo exit (e.g., air cargo exit corresponding to the destination). In such examples, the air cargo operator may push the ULD to the designated air cargo exit. In some examples, the ULD may be configured to traverse powered ball decking, caster decking, and/or roller decking. In some examples, the powered ball decking, caster decking, and/or roller decking may assist the air cargo operator in pushing the ULD across the first floor.

In various examples, the powered ball decking, caster decking, and/or roller decking may enable the automation of ULD movement. In some examples, the centralized load planner may determine a path across the ball decking, caster decking, and/or roller decking the ULD will traverse from the consolidation station to the designated air cargo exit. In such examples, the centralized load planner may power corresponding ball decking, caster decking, and/or roller decking to move the ULD across the first floor. In various examples, an air cargo operator and/or other safety observer may monitor the safe traversal of the ULD across the ball decking, caster decking, and/or roller decking.

The ground shipment container may be moved across the first floor of the storage facility via a drive unit or human powered vehicle on a driving surface. The driving surface may include a substantially smooth surface that comprises a second portion of the surface of the first floor. In some examples, the driving surface may be configured for drive units to traverse the floor automatically. In such examples, the driving surface may include mapping indicators, route indicators, and/or other means by which the drive units may automatically traverse the second portion of the surface of the first floor. The drive units may deliver the ground shipment container to a designated ground cargo loading area. The designated ground cargo loading area may correspond to a semi-trailer truck bound for the appropriate destination.

Additionally, the transfer facility may be configured to efficiently transfer containers including packages bound for a single destination (e.g., single destination container) from a first vessel (e.g., cargo airplane, semi-trailer truck, etc.) to a second vessel. A first vessel may arrive with a single destination container. In some examples, the single destination container may enter the transfer facility via an air cargo entrance. In such examples, the single destination container may be moved across the first portion of the surface of the first floor via the ball decking, caster decking, and/or roller decking. In some examples, the single destination container may enter the facility via a ground cargo entrance. In such examples, the single destination container may be moved across the second portion of the surface of the first floor via a drive unit or human powered vehicle.

In various examples, the first vessel and the second vessel may both include cargo airplanes (air-to-air transfer). In such examples, the single destination container may be moved across the first portion of the surface of the first floor to a designated loading area corresponding to the second cargo airplane (e.g., second vessel). In various examples, the first vessel and the second vessel may both include semi-trailer trucks. In such examples, the single destination container may be moved across the second portion of the surface of the first floor to a designated loading area corresponding to the second semi-trailer truck (e.g., second vessel).

In various examples, the first vessel and the second vessel may include vessels of different types (e.g., first vessel as a cargo airplane, second vessel as a semi-trailer truck, or vice versa). In such examples, the single destination container may be moved across the first floor to a consolidation station. For example, a single destination ULD may be moved across the first floor via ball decking, caster decking, and/or roller decking to a consolidation station. For another example, a single destination ground shipment container may be moved across the first floor via a drive unit to a consolidation station. In various examples, a package consolidator at the consolidation station may remove packages from a first single destination ULD and place them in a second single destination ground shipment container, or vice versa. Based on a determination that the second single destination ULD and/or ground shipment container is at capacity or otherwise ready for shipment, such as described above, the second single destination ULD and/or ground shipment container may be moved to the appropriate cargo loading area.

As discussed herein, robots and/or robotic package processing systems may include systems configured to scan, move, and process packages and/or containers in a transfer facility. Such systems may include networked architectures, servers, and other computing systems operable to perform scanning and movement of packages and/or containers throughout the transfer facility. While the discussion herein relates to optimizing the transfer of goods through a transfer facility configured for air and ground shipments, the concepts and techniques discussed herein may be applicable across other facilities. For instance, the techniques described herein may be applicable to package sortation facilities, air-to-sea shipment facilities, ground-to-sea shipment facilities, or the like.

FIG. 1 illustrates an example transfer facility 100 configured to optimize air-to-ground, ground-to-air, air-to-air, and ground-to-ground transfers. The transfer facility 100 may include a first floor 102, a second floor 104, and one or more first-to-second floor conveyors 106. Though illustrated as an angled conveyor, such as a belt conveyor or powered roller conveyor, the first-to-second floor conveyor(s) 106 may additionally or alternatively include vertical conveyors, such as elevators or the like. As illustrated in FIG. 1, the transfer facility 100 includes two floors, however this is merely for illustrative purposes and a greater or lesser number of floors may be contemplated. For example, a transfer facility 100 may additionally include a third floor, such as to further increase a package sortation throughput.

A surface of the first floor 102 may include a first portion 108 and a second portion 110. The first portion 108 may be configured with ball decking, caster decking, and/or roller decking to assist in moving large containers, such as unit load devices (ULDs) 112(1), 112(2), 112(3), etc. The ball decking, caster decking, and/or roller decking may be powered and/or non-powered. The powered ball decking, caster decking, and/or roller decking may include balls, caster wheels, and/or rollers that are connected to a power source, such as one or more motors. The powered balls, caster wheels, and/or rollers may be configured to move in one or more directions, such as directed by one or more drivers. The one or more drivers may receive input from a centralized load planning system (e.g., centralized load planner) and/or other computing device associated with the transfer facility and may cause the powered balls, caster wheels, and/or rollers to move in a particular direction to assist in moving a particular ULD from a first location to a second location of the first floor 102. For example, a ULD 112(1) may be offloaded from a cargo airplane 114, brought inside the transfer facility 100 via one or more air cargo doors 116, and placed in an air cargo loading/unloading station 118. A centralized load planner and/or air cargo operator may determine that the ULD includes packages bound for multiple destinations. In various examples, the centralized load planner and/or air cargo operator may determine that the packages in the ULD are bound for multiple destinations by scanning a label on the ULD. Based on the multiple destinations of the packages, the centralized load planner and/or air cargo operator may determine a movement of the ULD 112(1) from the air cargo loading/unloading station 118 to a conveyor loading station 120, such as illustrated by a first path 122(1). The centralized load planner and/or air cargo operator may activate the powered ball decking, caster decking, and/or roller decking to move the ULD 112(1) along the first ULD path 122(1).

For another example, centralized load planner and/or air cargo operator may determine that the ULD 112(1) includes packages bound for the same destination (e.g., ULD 112(1) is a single destination container) via ground transportation, such as via semi-trailer truck 124 or another vehicle. Based on the determination that the ULD 112(1) includes packages bound for the same destination via the semi-trailer truck 124, the centralized load planner and/or air cargo operator may activate powered ball decking, caster decking, and/or roller decking to move the ULD 112(1) along a second ULD path 122(2) to a consolidation station 126(1). At the consolidation station 126(1), a package consolidator 128(1) may remove the packages from the ULD 112(1) and place them in a ground shipment container 130(1) for transportation via the semi-trailer truck 124. The package consolidator 128(1) may include a human or a robot configured to load packages 146 into one or more ULDs 112 and/or ground shipment containers 130. Although illustrated as a single package consolidator 128(1), the consolidation station 126(1) may, in some examples, include one or more package consolidators 128(1). For yet another example, the centralized load planner and/or air cargo operator may determine that the ULD 112(1) is a single destination container to be transported via air, such as on cargo airplane 114. Based on the determination that the ULD 112(1) includes packages bound for the same destination via the cargo airplane 114, the centralized load planner and/or air cargo operator may activate powered ball decking, caster decking, and/or roller decking to move the ULD 112(2) to a second air cargo loading/unloading station. The second air cargo loading/unloading station may be the same or different from air cargo loading/unloading station 118.

In various examples, the ball decking, caster decking, and/or roller decking may be non-powered. The non-powered ball decking, caster decking, and/or roller decking may be configured to move freely based on a force applied thereto, such as to assist in the movement of a ULD 112(1) across the first portion 108. In some examples, an air cargo operator may push or otherwise guide the ULD 112(1) across the first portion 108 from a first location to a second location on the first floor 102. For example, an air cargo operator may determine that an offloaded ULD 112(1) in the air cargo loading/unloading station 118 includes packages bound for multiple destinations, such as by scanning a label on the ULD 112(1). Based on the packages in the ULD 112(1) being bound for multiple destinations, the air cargo operator may determine that the packages will be sorted on the second floor 104. The air cargo operator may then push or otherwise guide the ULD 112(1) from the air cargo loading/unloading station 118 to the conveyor loading station 132, such as along the first ULD path 122(1). For another example, based on a determination that the ULD 112(1) is a single destination container, the air cargo operator may push or otherwise guide the ULD 112(1) to the consolidation station 126(1) for package transfer from the ULD 112(1) to the ground shipment container 130(1), such as by package consolidator 128(1) or to a second air cargo loading/unloading station. The second air cargo loading/unloading station may be the same or different from air cargo loading/unloading station 118.

In various examples, the ground shipment container 130 (1) may be moved across the second portion 110 of the first floor 102 via a drive unit 134 or a human powered vehicle 136. The second portion 110 may include a substantially smooth surface configured for vehicular traffic. In some examples, the second portion 110 may include a sloped floor to facilitate vehicular movement in a particular direction. In such examples, the second portion 110 may include a slight slope, such as 0.5-degree, 1.5 degree, 2 degree, or the like. In some examples, the second portion 110 may be configured for drive units 134 to operate. In such examples, the second portion 110 may include markings (e.g., painted on, etched into, embedded within a surface of the second portion 110) or other means by which the drive units 134 and/or human powered vehicles 136 may navigate from a first location to a second location. In some examples, the markings may include codes, such as quick reference (QR) codes or other codes with encoded data, to facilitate navigation. In some examples, the markings may include lane differentiations to direct the flow of drive units 134 across the second portion 110. In various examples, the drive units 134 and/or human powered vehicles 136 (such as via an operator computing device) may receive information regarding the first location and/or the second location from a consolidation computing device, such as that utilized by package consolidator 128(1) and/or from the centralized load planner, based on data associated with the ground shipment container 130(1) (e.g., destination, etc.).

In various examples, a drive unit 134 may be loaded with a ground shipment container 130 in a ground cargo loading/unloading station 138. In various examples, a ground cargo operator (not illustrated) may determine that the shipment container 130, such as ground shipment container 130(4), is a single destination container. The ground cargo operator may include a human and/or robot configured to determine information about packages arriving to and departing from the ground cargo loading/unloading station 138. In various examples, the ground cargo operator may determine that ground shipment container 130(4) is a single destination container by scanning a label associated with the ground shipment container 130(4), such as utilizing a ground cargo computing device. Additionally, the ground cargo operator may determine the mode of transportation of the single destination ground shipment container 130(4). Based on a determination that the ground shipment container 130(4) is a single destination container to be transported via air, the ground cargo operator may cause a drive unit 134 or a human powered vehicle 136 to deliver the ground shipment container 130(4) to the consolidation station 126(2) for transfer of the packages from the ground shipment qcontainer 130(4) to the ULD 112(2) for transportation via air cargo. Based on a determination that the ground shipment container 130(4) is a single destination container to be transported via ground, the ground cargo operator may cause the drive unit 134 or a human powered vehicle 136 to deliver the ground shipment container 130(4) to a second cargo loading/unloading station for loading onto a semi-trailer truck 124 or another vehicle.

In various examples, the ground cargo operator may determine that the ground shipment container 130 includes packages bound for multiple destinations (e.g., multi-destination container). In some examples, based on the multi-destination container determination, the ground cargo operator may cause a ground shipment container 130(2) to be loaded onto a drive unit 134(1), such as in the ground cargo loading/unloading station 138. In such an example, the ground shipment container 130(2) may be offloaded from the semi-trailer truck 124 or other vehicle through the ground cargo door 140 and placed on the drive unit 134(1). In some examples, the ground cargo operator may direct the drive unit 134(1) to deliver the ground shipment container 130(2) to the conveyor loading station 132, such as via a first ground shipment path 142(1). Additionally or alternatively, a ground shipment container 130(3) may be offloaded from the semi-trailer truck 124 and moved to the conveyor loading station 132 via the human powered vehicle 136, such as via second ground shipment path 142(2).

In various examples, a conveyor loader 144 may load packages 146(1), 146(2), 146(3), etc. (collectively packages 146) onto the first-to-second floor conveyor(s) 106 in the conveyor loading station 132. The conveyor loader 144 may include a human or a robot configured to load packages 146 onto the first-to-second floor conveyor(s) 106. Although illustrated as a single conveyor loader 144, the transfer facility 100 may include one or more conveyor loaders 144 per first-to-second floor conveyor 106. As discussed above, the packages 146 that arrive at the transfer facility 100 in a multi-destination ULD 112 and/or ground shipment container 130 (e.g., ULD 112 and/or ground shipment container 130 including a plurality of packages destined for a plurality of destinations). In various examples, the conveyor loader 144 may load packages 146(1), 146(2), 146(3), etc. onto the first-to-second floor conveyor(s) 106 based on a determination that the packages 146(1), 146(2), 146(3), etc. are less than or equal to a threshold size. The threshold size may be a predefined size based on the size of the first-to-second floor conveyor(s) 106, a size of package 146 a drive unit 134 may carry, or the like. Based on a determination that a package 146(N) is above the threshold size, the conveyor loader 144 may set the package 146(N) aside, not placing it on the first-to-second floor conveyor(s) 106. The conveyor loader 144 may additionally or alternatively place the package 146(N) on a drive unit 134, a human powered vehicle 136, or provide the package 146(N) to another worker for delivery to a consolidation station 126(1).

In the illustrative example, the packages 146 may transit from the first floor to the second floor via the first-to-second floor conveyor(s) 106. In the illustrative example, the second floor 104 may include a conveyor system 148 configured to deliver packages from the first-to-second floor conveyor(s) 106 to an induction station 150. Although illustrated as a single conveyor including a vertical component and a horizontal component, the conveyor system 148 may include multiple conveyors configured to deliver packages to the induction stations 150. Additionally or alternatively, the second floor 104 may include a package distribution station in which the packages 146 may be loaded onto drive units 134 for delivery to an induction station 150. In some examples, a package loader may load packages from the first-to-second floor conveyor(s) 106 onto the drive units 134 for delivery to the induction stations 150. In some examples, the drive units 134 may be configured to move into a position proximate to the first-to-second floor conveyor(s) 106 such that a package may move from the first-to-second floor conveyor(s) 106 onto a surface of the drive unit 134 without human intervention. In various examples, the drive units 134 may be programmed to transit from the package distribution station to the induction station 150(1), 150(2), and back to the package distribution station. In some examples, the drive units 134 may deliver the packages to the induction station and may receive additional information about a second location in which to deliver the package.

Additionally or alternatively, the packages 146 may be transported to an induction station 150 on the second floor 104 via one or more unmanned aerial vehicles (UAVs) configured to carry packages. In various examples, the conveyor loader 144 may place a package 146 in a package loading zone. The UAV(s) may be configured to approach the package loading zone, secure the package via one or more arms, and deliver the package to an induction station 150. In various examples, the UAV(s) may be configured to communicate with the central load planner to determine a particular induction station 150 for delivery. In some examples, the UAV(s) may be configured to automatically determine the particular induction station 150 based on a perceived package backlog, such as that perceived by a camera of the UAV and/or data provided by one or more remote sensors. In various examples, the UAV(s) may fly through a same opening between the first floor 102 and the second floor 104 as the first-to-second floor conveyor 106. In some examples, the UAV(s) may have designated openings for transiting from the first floor 102 to the second floor 104 and vice versa.

In some examples, a package processor 152 may process packages 146 at an induction station 150. The package processor 152 may include a human and/or a robot configured to process/assist in processing a package 146, such as package 146(3). In various examples, the package processor 152 may determine a destination and/or mode of transportation for a package 146, such as package 146(3). In some examples, the package processor 152 may scan a label on the package 146(3) to determine the destination and/or mode of transportation. In such examples, an induction computing device may present on a display thereof, the destination and/or mode of transportation for the package 146(3). In some examples, the induction computing device may display the destination and/or mode of transportation based on data encoded in the label (e.g., in a QR code, bar code, etc.). In some examples, the induction computing device may send data associated with the package 146(3) to the centralized load planner. In such examples, the induction computing device may receive the destination and/or mode of transportation from the centralized load planner.

Based on the destination and/or mode of transportation for the package 146(3), the package processor 152 may determine a chute 154 associated with a consolidation station 126 at which packages 146 bound for the destination and/or the destination via the mode of transportation are being consolidated. In various examples, the induction computing device may receive data associated with the chute 154 that corresponds to the appropriate consolidation station 126, such as from the centralized load planner. For example, the package processor 152 may determine that package 146(3) is bound for Austin, Tex. via air cargo. The package processor 152 may determine that packages bound for Austin, Tex. are being consolidated at consolidation station 126(2). The package processor 152 may identify chute 154(1) as being associated with consolidation station 126(2).

The package processor 152 may load the package 146(3) onto a drive unit 134, such as drive unit 134(2) for delivery to the identified chute 154(1). In various examples, the package processor 152 may program the drive unit 134 to deliver the package to the identified chute 154(1). For example, the package processor 152 may input a number, code, or other identifier associated with the chute into an input/output device of the drive unit 134(2). The drive unit 134(2) may thus be configured to traverse the second floor 104, such as along a designated path 156, to the chute 154(1). In various examples, the drive unit 134(2) may be configured to determine the path 156 to follow based on a location associated with the induction station 150, a location associated with the chute, a pre-determined insertion point for packages 146 into the chute 154(1), or the like.

In various examples, the centralized load planner may send data associated with the chute 154(1) to the drive unit 134(2). In such examples, the centralized load planner may receive data associated with the package 146(3), identify the chute 154(1), and send data corresponding to the chute directly to the drive unit 134(2). In various example, the drive unit 134(2) may receive data associated with the identified chute 154(1) and may deliver the package to the chute 154(1) via the path 156. In the illustrative example, the drive unit 134(2) may return along the path 156 to the induction station 150 from which it originated with package 146(3). In other examples, the drive unit 134(2) may be programmed to travel to a different induction station 150 or other location on the second floor 104 after delivering the package to the chute 154(1).

In various examples, based on an arrival at the chute 154(1) and/or a pre-determined insertion point for packages 146 into the chute 154(1), the drive unit 134(2) may cause the package to be inserted into the chute 154(1). In some examples, the drive unit 134(2) may lift a portion of a surface on which the package 146(3) rests to cause the package 146(3) to slide off the drive unit 134(2) into the chute 154(1). In some examples, the drive unit 134(2) may include a conveyor belt, a tilt tray, a roller tray, or other method for facilitating the package 146(3) sliding off the drive unit 143(2) into the chute 154(1). In some examples, the drive unit 134(2) may include one or more robotic arms configured to lift the package 146(3) and insert it into the chute 154(1).

Based on an insertion of the package 146(3) into the chute 154(1), the package 146(3) may travel, such as via gravity assist along a slide 158, to the consolidation station 126(2). Although illustrated as a spiral slide, the slide 158 may be any shape or configuration configured to guide a package 146(3) from the second floor 104 to the first floor 102. For example, the slide 158 may include a curved slide, a straight slide, a belt conveyor, a roller conveyor, an elevator or other vertical conveyor, or the like.

A package consolidator 128(2) may receive the package 146(3) at the base of the slide in the consolidation station 126(2). The package consolidator 128(2), similar to package consolidator 128(1) discussed above, may include a human or a robot configured to load packages into one or more ULDs 112 and/or one or more ground shipment containers 130. In some examples, the package consolidation station 126(2) may be configured to accept packages bound for a destination via a particular mode of transportation. In such examples, the package consolidation station 126(2) may be equipped with one or more containers (e.g., ULDs, ground shipment containers, etc.) associated with the particular mode of transportation. For example, a consolidation station 126(3) may be configured for the consolidation of packages bound for a destination via the semi-trailer truck 124 or other vehicle (e.g., ground transportation). As such, the consolidation station 126(3) may include one or more ground shipment containers 130. For another example, a consolidation station 126 may be configured for the consolidation of packages bound for a destination via a cargo airplane 114. In such an example, the consolidation station 126 may include one or more ULDs 112 and/or other container configured for shipment via air cargo.

In the illustrative example, the consolidation station 126(2) is configured to receive packages being transported to a destination via ground and air transportation. As such, the consolidation station 126(2) includes a ULD 112(2) and a ground shipment container 130(4) configured to receive packages bound for the destination. Based on receiving the package 146(3) via the slide 158, the package consolidator 128(2) may determine a mode of transportation for the package 146(3) (e.g., air, ground, etc.). In some examples, the package consolidator 128(2) may scan or otherwise read a label on the package 146(3) to determine the mode of transportation. The package consolidator 128(2) may load the package 146(3) into the appropriate container associated with the mode of transportation. For example, the package consolidator 128(2) may scan the package 146(3) and determine that the package 146(3) is bound for Austin, Tex. via air transportation. Based on the determination that the mode of transportation is air cargo, the package consolidator 128(2) may place the package 146(3) in the ULD 112(2). For another example, the package consolidator 128(2) may scan the package 146(3) and determine that the package 146(3) is bound for Austin, Tex. via ground transportation. Based on the determination that the mode of transportation is ground cargo, the package consolidator 128(2) may place the package 146(3) in the ground shipment container 130(4).

In various examples, the package consolidator 128(2) may input data associated with the package 146(3) into a consolidation computing device prior to loading the package 146(3) into the appropriate container. In some examples, the data may be input based on the scan of the package 146(3) to determine a destination thereof. In various examples, the consolidation computing device may determine a weight associated with the package 146(3), the contents of the package 146(3), and the like, with the appropriate container. In some examples, the package consolidator 128(2) may scan the label on the package 146(3) and scan the label of the container into which the package consolidator 128(2) loads the package 146(3). For example, the package consolidator 128(2) may scan the label of the package 146(3), determine the mode of transportation is air cargo, scan a label on the ULD 112(2), and place the package 146(3) in the ULD 112(2).

In various examples, the consolidation computing device may be configured to determine characteristics of the ULD 112(2) and/or the ground shipment container 130(4) based on the packages 146 inserted therein. The characteristics may include a weight, a number of packages, a total value of packages, contents of packages, or the like. In various examples, the consolidation computing device may provide the characteristics to the centralized load planner. For example, the consolidation computing device may determine a weight associated with each package 146 placed into the ULD 112(2) and may send the total weight of the ULD 112(2) to the centralized load planner after each package 146 is inserted therein.

In various examples, the consolidation computing device may be configured to determine that a ULD 112(2) and/or a ground shipment container 130(4) is at capacity (e.g., full). In some examples, the determination that the respective container is at capacity may be based on a lack of space remaining after a last package 146 was inserted therein. In some examples, the package consolidator 128(2) may determine that no further packages 146 may be able to fit in the respective container. In such examples, the package consolidator 128(2) may provide an input to the consolidation computing device that the respective container is at capacity. In some examples, based on a determination that the respective container is at capacity, the consolidation computing device may send a message to the centralized load planner indicating that the respective container is at capacity.

In some examples, the determination of capacity may be based on one or more characteristic limitations. The characteristic limitation may include a maximum number of packages, maximum value of packages, maximum weight, or the like. Based on a determination that a characteristic limitation is met (e.g., at a maximum number of packages, at a maximum weight, etc.) or is within a threshold of being met (e.g., within 100 pounds of a maximum weight, within $500 of a maximum value, etc.), the consolidation computing device may determine that the respective container is at capacity. For example, to limit a liability associated with the loss of a ground shipment container 130, such as due to theft or the like, a ground shipment container 130(4) may be limited to a total value of $50,000. Based on a determination that the packages 146 inserted therein include a total value of $49,997, the consolidation computing device may determine that the ground shipment container 130(4) is at capacity. For another example, a ULD 112(2) may have associated therewith a maximum weight of 4,000 pounds due to weight and balance considerations on the associated cargo airplane 114. Accordingly, the consolidation computing device may determine that the ULD 112(2) is full based on the weight approaching the maximum weight of 4,000 pounds.

In some examples, the characteristic limitation(s) may be pre-determined based on the container (e.g., ULD 112, ground shipment containers 130, etc.). In such examples, the characteristic limitation(s) may be the same for each ULD 112 and/or each ground shipment container 130. For example, ground shipment containers 130 may be limited to a maximum weight of 500 kilograms. In some examples, the characteristic limitation(s) may be dynamically determined based on one or more factors. The one or more factors may include limitations associated with the particular implement of transportation (e.g., cargo airplane 114, semi-trailer truck 124, or the like), the destination, or the like. In such examples, the consolidation computing device and/or the centralized load planner may determine characteristic limitation(s) for an individual ULD 112 and/or an individual ground shipment container 130 based on the one or more factors. For example, a first ground shipment container 130(1) may have associated therewith a maximum value of $40,000, whereas a second ground shipment container 130(3) may have associated therewith a maximum value of $80,000.

In various examples, the consolidation computing device may receive the characteristic limitation(s) from the centralized load planner. In such examples, the centralized load planner may determine the characteristic limitation(s) based on the container (e.g., ULD 112 or ground shipment container 130), the implement of transportation (e.g., cargo airplane 114, semi-trailer truck 124, or the like), the associated destination, or the like, and may provide the characteristic limitation(s) to the consolidation computing device. In some examples, the consolidation computing device may have stored thereon, predetermined characteristic limitations associated with the ULDs 112 and the ground shipment containers 130.

In various examples, the package consolidator 128(2) and/or the consolidation computing device may determine that the ULD 112(2) and/or ground shipment container 130(4) is at capacity. In some examples, the package consolidator 128(2) and/or consolidation computing device may send a message to the centralized load planner indicating that the ULD 112(2) and/or ground shipment container 130(4) is at capacity. In some examples, the package consolidator 128(2) and/or consolidation computing device may send a message to an air cargo operator (e.g., person or robot designated to assist in moving ULDs), drive unit 134, and/or operator of a human powered vehicle 136 to move the respective ULD 112(2) and/or ground shipment container 130(4).

In various examples, based on a determination that the ULD 112(2) is at capacity, the ULD 112(2) may be moved across the first portion 108 of the surface of the first floor 102. As described above, the first portion 108 may include ball decking, caster decking, and/or roller decking to facilitate the movement of the ULD 112(2). The ULD 112(2) may be moved from the consolidation station 126(2) to a second location designated for loading air cargo. In some examples, the second location may be based on the destination associated with package 146(3). The second location associated with loading air cargo may be the same or different from air cargo loading/unloading station 118. In various examples, based on an indication that the ULD 112(2) is at capacity, the centralized load planner may activate ball decking, caster decking, and/or roller decking to in order to move the ULD 112(2) from the consolidation station 126(2) to the second location associated with air cargo loading. In some examples, an air cargo operator may receive a message that the ULD 112(2) is ready to be moved to the second location, such as from the centralized load planner and/or the consolidation computing device. The air cargo operator may thus push or otherwise cause the ULD 112(2) to move across the first portion 108 of the first floor 102 to the second location associated with air cargo loading.

In various examples, based on a determination that the ground shipment container 130(4) is at capacity, the ground shipment container 130(4) may be moved across the second portion 110 of the surface of the first floor 102. As described above, the second portion 110 may be configured for drive units 134 and/or human powered vehicles 136 to operate. For example, the second portion 110 may include one or more codes embedded in the floor to assist the drive units 134 in determining a current location and navigating to another location. For another example, the second portion 110 may include one or more signs posted throughout and visible to a human operating the human powered vehicle 136 to assist the human in determining a current location and navigating to another location.

In various examples, a drive unit 134 and/or a human powered vehicle operator, such as via a computing device, may receive an indication that the ground shipment container 130(4) is ready to be moved from the first location associated with the consolidation station 126(2) to a second location associated with ground cargo loading. The second location associated with ground cargo loading may be the same or different from the ground cargo loading/unloading station 138. In some examples, the drive unit 134 and/or a human powered vehicle operator may determine the second location based on the destination associated with the ground shipment container 130(4). For example, the drive unit 134 and/or a human powered vehicle operator may determine that the semi-trailer truck 124 is bound for Austin, Tex. Accordingly, the drive unit 134 and/or a human powered vehicle operator may deliver the ground shipment container 130(4) to the ground cargo loading/unloading station 138 for loading onto the semi-trailer truck 124. In some examples, the centralized load planner may provide information regarding the second location to the drive unit 134. In such examples, the drive unit 134 may navigate to the second location based on the information provided by the centralized load planner.

Figure 2:
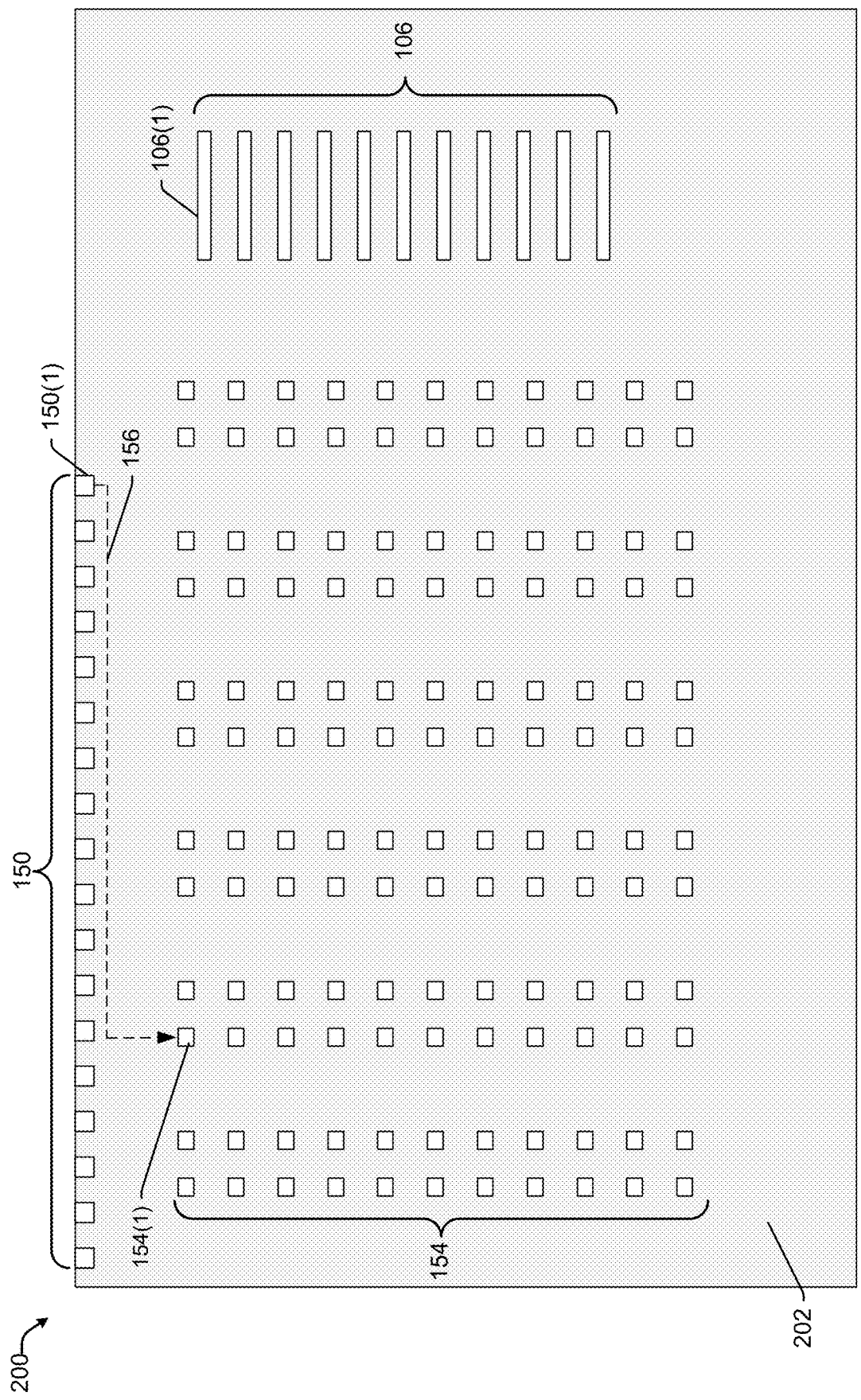
FIG. 2 illustrates an example layout of a top floor of a transfer facility configured with an optimized package transfer system.

FIG. 2 illustrates an example layout of a second floor 200 of a transfer facility, such as second floor 104 of FIG. 1, configured for efficient package sorting to multiple destinations. The second floor 200 may include at least a top portion of one or more first-to-second floor conveyors 106. The first-to-second floor conveyor(s) 106 may be configured to carry a plurality of packages from a first floor, such as first floor 102 of FIG. 1 to the second floor 200 for package sortation. In various examples, the plurality of packages may include packages transported to the transfer facility in multi-destination containers (e.g., multi-destination ULDs, ground shipment containers, etc.).

In various examples, a package may be delivered to the second floor 200 via one of the first-to-second floor conveyor(s) 106, such as first-to-second floor conveyor 106(1). As discussed above, based on an arrival on the second floor 200, the package may be transported to an induction station 150, such as induction station 150(1). In various examples, such as that illustrated in FIG. 1, the second floor 200 may include one or more conveyors (e.g., substantially horizontal conveyors, horizontal conveyors with less than a threshold incline (e.g., 3 degree, 5 degree, etc.) to provide gravity assist to move the packages from a first location to a second location on the second floor) configured to deliver packages from the first-to-second floor conveyor(s) to the induction station 150(1). In various examples, a package loader may remove packages from the first-to-second floor conveyor 106(1) and place the packages on a conveyor of the one or more conveyors for delivery to the induction station 150(1). In some examples, a substantially horizontal conveyor of the one or more conveyors may be situated proximate to a first-to-second floor conveyor 106(1) such that the packages may automatically transfer from the first-to-second floor conveyor 106(1) to the substantially horizontal conveyor the one or more conveyors.

In some examples, the package may be transported to the induction station 150(1) manually, such as by a human carrying the package across the second floor 200. In various examples, the second floor 200 may be configured for drive units, such as drive units 134, to operate thereon. In such examples, a surface 202 of the second floor 200 may include markings (e.g., painted on, etched into, embedded within a surface of the second floor 200) or other means by which the drive units may navigate. In some examples, the markings may include codes, such as quick reference (QR) codes or other codes with encoded data, to facilitate navigation. In some examples, the markings may include lane differentiations to direct the flow of drive units across the surface 202. In various examples, the packages may be transported to an induction station 150, such as induction station 150(1) via a drive unit. In such examples, the package loader may remove a package from the first-to-second floor conveyor 106(1) and place the package on the drive unit for delivery to the induction station 150(1). In some examples, the package loader may program the drive unit to deliver the package to the induction station 150(1), such as by inputting an identifier associated with the induction station 150(1) into a computing device associated with the drive unit.

In some examples, the drive unit may receive an instruction to deliver the package to the induction station 150(1) from a centralized load planner. In some examples, the drive unit may be configured to identify the induction station 150(1) for package delivery. In some examples, the drive unit may be programmed to deliver packages to a particular induction station 150(1). In such examples, the drive unit may continually deliver packages from the first-to-second floor conveyor 106(1) to the induction station 150(1).

In various examples, the drive unit and/or the centralized load planner may determine the induction station based on a package backlog at each induction station 150. In such examples, the drive unit and/or centralized load planner may be configured monitor a package backlog at each induction station 150 and identify the induction station 150(1) for delivery based on a backlog associated therewith, such as to maximize efficiency. In various examples, the package backlog may be determined based on a number of drive units awaiting package offload at the respective induction stations 150.

In some examples, the drive unit and/or the centralized load planner may be configured to determine the package backlog and/or determine the induction station 150(1) based on data received from one or more sensors on the second floor. The one or more sensors may include perception sensors, such as cameras, lidar, radar, or the like. The one or more sensors may be mounted on the drive units and/or in one or more positions on the second floor (e.g., on a wall, at an induction station, etc.). In some examples, the drive unit and/or the centralized load planner may be configured to determine package backlog and/or the induction station 150(1) based on a location and/or velocity of drive units on the second floor. In such examples, the drive unit and/or centralized load planner may determine the package backlog and/or the induction station 150(1) based on a number of drive units in proximity to one another and/or the number of drive units with a velocity less than a threshold velocity (e.g., substantially zero velocity, less than 1 mile per hour, less than 5 kilometers per hour, etc.). For example, six drive units may be located proximate to a first induction station 150 and one drive unit may be located proximate to a second induction station 150. The drive unit and/or centralized load planner may determine that the package backlog at the second induction station 150 is lower and thus may determine to deliver the package to the second induction station 150.

In various examples, a package processor, such as package processor 152, at the induction station 150(1) may process the package. The package processor may include a human and/or a robot configured to process/assist in processing a package. In various examples, the package processor may determine a destination and/or mode of transportation for a package. In some examples, the package processor may scan a label on the package to determine the destination and/or mode of transportation. In such examples, an induction computing device may present, on a display thereof, the destination and/or mode of transportation for the package. In some examples, the induction computing device may display the destination and/or mode of transportation based on data encoded in the label (e.g., in a QR code, bar code, etc.). In some examples, the induction computing device may send data associated with the package to the centralized load planner and may receive the destination and/or mode of transportation from the centralized load planner.

The package processor may determine a consolidation station associated with the destination and/or mode of transportation. In some examples, the consolidation station may be configured to accept packages bound for a particular destination via a particular mode of transportation. For example, a consolidation station may be configured to accept packages bound for Ithaca, N.Y. via air transportation. In some examples, the consolidation station may be configured to accept packages bound for a destination via two or more modes of transportation. For example, a consolidation station may be configured to accept packages bound for Ithaca, N.Y. via air and ground transportation. In such an example, the consolidation station may include a first container configured for air transportation and a second container configured for ground transportation. Based on a determination of the consolidation station associated with the destination and/or mode of transportation, the package processor may identify a chute 154 associated therewith, such as chute 154(1). The chute 154 may include an opening in the flooring of the second floor 200 to permit package transfer from the second floor to the first floor. The chute 154 may be coupled to a slide, conveyor, or other means to facilitate the transfer of the package from the chute 154 to the consolidation station on the first floor. In at least one example, a first end of a spiral slide may be coupled to the chute 154 and a second end of the spiral slide may be located in the consolidation station.

The package processor may place the package on a drive unit for delivery to the chute 154(1) associated with the consolidation station. In various examples, the package processor may program the drive unit to deliver the package to the chute 154(1). In such examples, the package processor may input an identifier associated with the chute 154(1) into an input/output device of the drive unit and/or send the identifier to a computing device of the drive unit, such as from the induction computing device. For example, the package processor may send a message from the induction computing device to the drive unit (e.g., computing device) with data associated with the consolidation station and/or chute associated therewith. For another example, the package processor may cause the identifier to be uploaded to the drive unit computing device.

In various examples, the drive unit may be configured to determine the chute 154(1) associated with the consolidation station. In some examples, the drive unit may receive the destination and/or mode of transportation of the package, such as from the induction computing device, and may determine the chute 154(1) associated with the destination and/or mode of transportation. In some examples, the drive unit may have stored, thereon, a layout of the chutes 154 on the second floor 200 and a destination and/or mode of transportation associated with each chute 154. Based on the destination and/or mode of transportation associated with the package, the drive unit may determine that chute 154(1) is corresponds to the appropriate consolidation station.

In some examples, the drive unit may receive data associated with the chute 154(1) from a centralized load planner. In such examples, the centralized load planner may receive data associated with the package from the induction computing device, such as responsive to the package processor scanning the label on the package. The centralized load planner may determine the destination and/or mode of transportation associated with the package and may identify the consolidation station and/or chute 154(1) corresponding thereto. In some examples, the centralized load planner may be configured to determine a planned mode of transportation of the package, such as based on the label, and determine to modify the mode of transportation. The determination to modify the mode of transportation may be based on an efficiency associated with the planned mode of transportation (e.g., first mode of transportation) and an efficiency associated with a second mode of transportation. For example, the centralized load planner may determine that construction along a route of travel for ground transportation of a package has increased a time associated with delivery above a threshold time. The centralized load planner may determine that the package should be transported via air transportation in order to ensure an on-time delivery. Accordingly, the centralized load planner may modify the mode of transportation to air transportation. In various examples, the centralized load planner may send data associated with the appropriate consolidation station and/or chute 154 to the drive unit for delivery.

The drive unit may be configured to automatically navigate to the chute 154(1) across the surface 202 of the second floor 200, such as via path 156. The drive unit may be configured to approach a designated insertion point of the chute 154(1) for package insertion. Based on a determination that the drive unit is in position at the designated insertion point, the drive unit may cause the package to be inserted into the chute 154(1). In some examples, the surface of the drive unit on which the package rests may tilt, such as to permit the package to slide into the chute 154(1). In some examples, the drive unit may include one or more robotic arms configured to lift the package from the drive unit and insert it into the chute 154(1). Based on an insertion into the chute 154(1), the package may transit directly to the consolidation station on the first floor, such as via the slide, conveyor, or other means to facilitate the transfer of the package.

Figure 3:
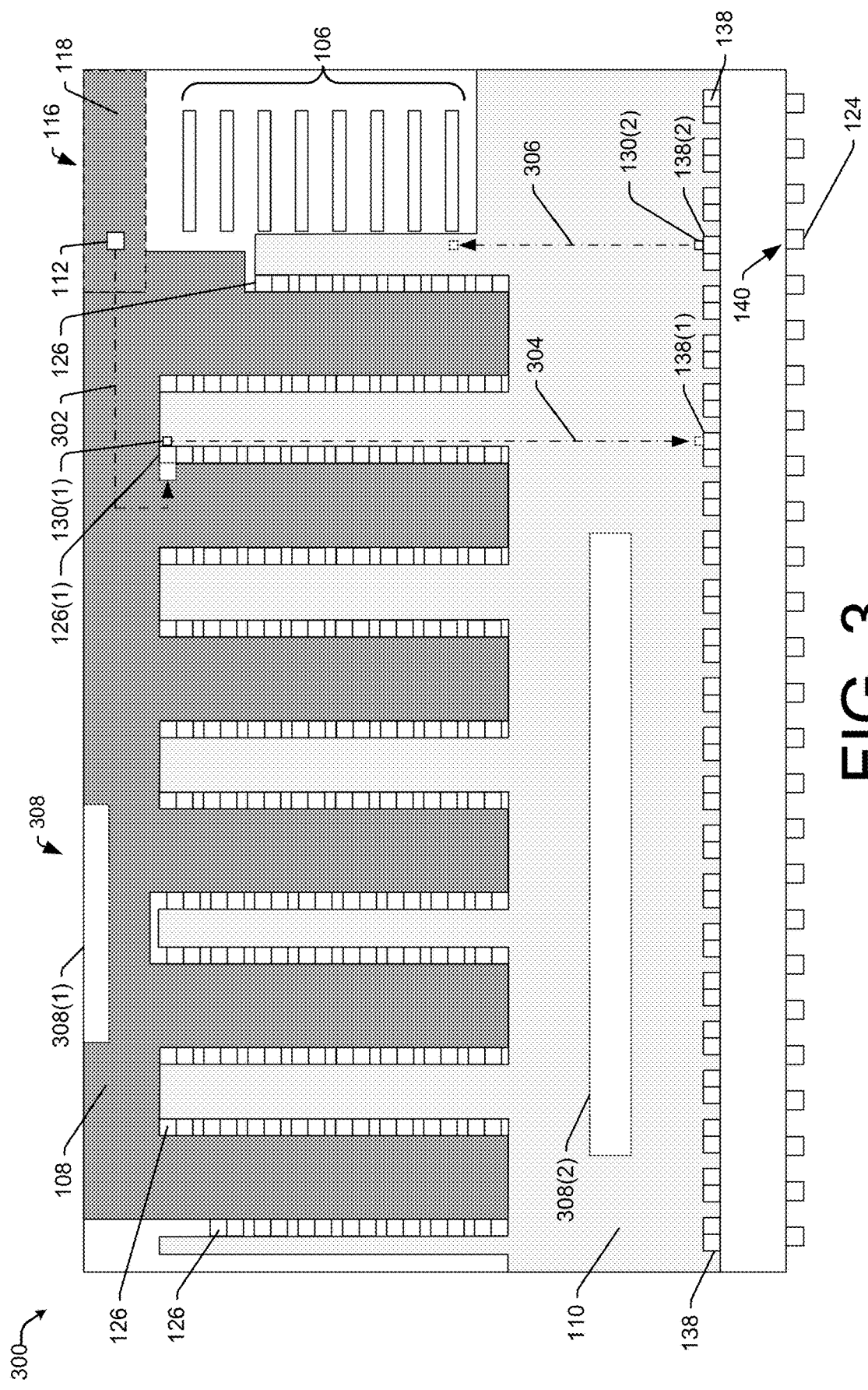
FIG. 3 illustrates an example layout of a ground floor of a transfer facility configured with an optimized package transfer system.

FIG. 3 illustrates an example layout of a first floor 300 of a transfer facility, such as the first floor 102 of FIG. 1, configured with an optimized package transfer system. The first floor may include one or more first-to-second floor conveyors 106 (e.g., bottom portions thereof) configured to assist in transferring packages from the first floor 300 to a second floor, such as second floor 104 and 200. As discussed above, packages may be transferred to the second floor via a first-to-second floor conveyor 106 for efficient sortation based on a destination and/or mode of transportation associated with the package.

A surface of the first floor 200 may include a first portion 108 and a second portion 110. The first portion 108 may be configured for moving unit load devices (ULDs) or other containers configured for air cargo. In some examples, the first portion 108 may include ball decking, caster decking, and/or roller decking. The ball decking, caster decking, and/or roller decking may include powered and/or unpowered balls, wheels, and/or rollers to assist in the movement of the ULDs or other containers across the first portion 108 from a first location to a second location on the first floor 300. For example, a single destination ULD including packages bound for a single destination via ground transportation may be offloaded from an airplane and placed in an air cargo loading/unloading station 118 and pushed and/or rolled to a consolidation station 126 for consolidating the packages into ground shipment containers. For another example, a multi-destination ULD including packages bound for multiple destinations may be offloaded from the airplane and pushed and/or rolled across the first portion 108 of the surface of the first floor to a second location associated with loading the one or more first-to-second floor conveyors 106.

The second portion 110 of the first floor may be configured for drive units and/or other vehicles (e.g., human powered, autonomous, semi-autonomous, etc.) to operate. In various examples, the second portion 110 may include markings, such as those embedded in, etched into, painted on the second portion 110. In such examples, the markings may assist the drive units and/or other vehicles to navigate across the second portion 110. In various examples, the drive units and/or other vehicles may be configured transport ground shipment containers between a ground cargo loading/unloading station 138, the first-to-second floor conveyors 106, and/or a consolidation station 126. For example, a drive unit may carry a multi-destination ground shipment container to the first-to-second floor conveyor(s) 106 for sortation based on respective destinations and/or modes of transportation. For another example, the drive unit may transfer a single destination ground shipment container designated for air transportation from the ground cargo loading/unloading station 138 to a consolidation station for package transfer into a ULD. For yet another example, a human powered vehicle may be configured to move a ground shipment container from the consolidation station 126 to the ground cargo loading/unloading station 138, such as based on a notification received from a consolidation station computing device and/or centralized load planner that the ground shipment container is at capacity and ready for transportation.

In various examples, the first floor 300 may be configured with one or more air cargo doors 116 and one or more ground cargo doors 140. The air cargo door(s) 116 may include the doors through which ULDs and/or other containers configured for air cargo may enter the first floor 300 (e.g., enter the transfer facility). The ground cargo door(s) 140 may include the doors through which ground shipment containers may enter the transfer facility. The ground cargo door(s) 140 may be configured (e.g., size, shape, height, etc.) such that a semi-trailer truck 124 may back up to a position proximate to (e.g., abutting, within a threshold distance, etc.) the ground cargo door 140.

In the illustrative example of FIG. 3, a ULD 112 may enter the first floor 300 via air cargo door(s) 116 and be placed in the air cargo loading/unloading station 118. An air cargo operator (e.g., person and/or robot configured to process inbound and/or outbound ULDs or other air cargo containers) may determine that the ULD 112 includes packages bound for a single destination (e.g., single destination ULD) via ground transportation. The air cargo operator may determine a consolidation station, such as consolidation station 126(1) configured to consolidate packages bound for the destination into ground shipment containers 130. The air cargo operator may thus direct the movement of the ULD 112 to the consolidation station 126(1), such as along a path 302. In various examples, the air cargo operator may push or otherwise guide the ULD 112 across the first portion 108 along the path 302 to the consolidation station 126(1). In some examples, the air cargo operator may cause the ULD 112 to be automatically moved to the consolidation station 126(1) via the path 302. In some examples, the air cargo operator may activate one or more powered balls and/or rollers on the first portion 108 to cause the ULD 112 to move to the consolidation station 126(1).

In some examples, the air cargo operator may send data associated with the ULD 112 to the centralized load planner. The centralized load planner may be configured to determine the consolidation station 126(1) configured to consolidate packages bound for the destination into ground shipment containers 130. In some examples, the centralized load planner may send a notification to the air cargo operator with information associated with the consolidation station 126(1). In some examples, the centralized load planner may activate the powered ball(s) and/or roller(s) on the first portion 108 to cause the ULD 112 to move along the path 302 to the consolidation station 126(1).

A package consolidator, such as package consolidator 128(1) may transfer packages from the ULD 112 into the ground shipment container 130, such as ground shipment container 130(1). In various examples, the package consolidator may scan a label or otherwise input data associated with each package into a consolidation computing device. In some examples, the consolidation computing device may transmit package data to the centralized load planner. In various examples, the package consolidator may monitor a level of capacity of the ground shipment container 130(1). The level of capacity may be based on an amount of space remaining, a weight, a value, a number of packages, or other characteristics of the ground shipment container 130(1). In some examples, the capacity may be based on a characteristic limitation associated with the ground shipment container 130(1). The characteristic limitation may include a maximum number of packages, maximum value of packages, maximum weight, or the like. Based on a determination that a characteristic limitation is met (e.g., at a maximum number of packages, at a maximum weight, etc.) or is within a threshold of being met (e.g., within 50 pounds of a maximum weight, within $500 of a maximum value, etc.), the package consolidator and/or consolidation computing device may determine that the respective container is at capacity (e.g., full).

Based on a determination that the ground shipment container is at capacity, the package consolidator may secure (e.g., close) the ground shipment container and send a notification to the centralized load planner and/or a computing device associated with a drive unit and/or other vehicle configured to move ground shipment containers 130. In various examples, the drive unit and/or other vehicle may receive a notification, such as from the centralized load planner and/or the consolidation computing device, to pick up the ground shipment container 130(1) at the consolidation station 126(1) and deliver the ground shipment container 130(1) to a designated ground cargo loading/unloading station 138, such as ground cargo loading/unloading station 138(1). In various examples, the drive unit and/or other vehicle may receive information regarding a designated path 304 to traverse the second portion 110 of the first floor 300. In some examples, the drive unit and/or other vehicle may be configured to determine the path 304 based on a location associated with the consolidation station 126(1) and a location associated with the designated ground cargo loading/unloading station 138(1).

In various examples, a ground cargo operator at a ground cargo loading/unloading station 138, such as ground cargo loading/unloading station 138(2), may receive a ground shipment container 130, such as ground shipment container 130(2), delivered to the transfer facility via the semi-trailer truck 124 and carried into the first floor 300 via ground cargo door 140. The ground cargo operator may determine that the ground shipment container 130(2) is a multi-destination container. In some examples, the ground cargo operator may determine the ground shipment container 130(2) is a multi-destination container by scanning or otherwise reading a label located thereon (e.g., manually reading a label, using an input/output device of a computing device to scan the label, etc.). In some examples, a computing device associated with the ground cargo operator may send information associated with the ground shipment container to the centralized load planner.

The ground cargo operator and/or the centralized load planner may cause a drive unit or other vehicle to pick up the ground shipment container 130(2) at the ground cargo loading/unloading station 138(2) and deliver the ground shipment container 130(2) to the first-to-second floor conveyor(s) 106 for transfer to the second floor for sortation. In some examples, the ground cargo operator and/or the centralized load planner may cause the drive unit or other vehicle to pick up the ground shipment container by sending a message to a computing device associated therewith. In such examples, the message may include a first location for pick up (e.g., the ground cargo loading/unloading station 138(2)) and a second location for drop off (e.g., the first to second floor conveyor(s) 106. In various examples, the message may include a path 306 in which the drive unit or other vehicle is to travel while transiting across the second portion 110. In some examples, the drive unit or other vehicle may be configured to determine the path 306 dynamically, such as based on a plurality of other drive units and/or other vehicles operating in the second portion 110.

In various examples, the first floor 300 of the transfer facility may include one or more storage spaces 308 to provide a buffer between loading and unloading transportation vehicles (e.g., airplanes, semi-trailer trucks, etc.) and delivering containers to and from various stations (e.g., consolidation stations 126, etc.) of the transfer facility. The storage space(s) 308 may include space for the temporary storage of containers, such as ULDs 112 in transit to and/or from air cargo loading/unloading stations 118 and ground shipment containers 130 in transit to and/or from ground cargo loading/unloading stations 138. In some examples, the containers may be stored in the storage space(s) 308 based on an indication of a time delay between when the package is prepared for transportation and a scheduled loading time of an airplane or semi-trailer truck associated therewith. In some examples, the container storage in the storage space 308 may be based on a determination that the time delay is equal to or greater than a threshold time interval (e.g., time delay of 30 minutes, 1 hour, 3 hours, etc.). For example, a ULD 112 with packages bound for a destination may be loaded at a consolidation station 126. Based on an indication that the ULD 112 is at capacity, the ULD 112 may be prepared for transportation to the air cargo loading/unloading station 118. Based on an indication that a time delay associated with the loading of a corresponding airplane is above a threshold time, the ULD 112 may be moved to a storage space 308, such as storage space 308(1).

In some examples, single destination containers may be stored in the storage space(s) 308 based on an indication of a time delay between arrival and/or offloading in the respective cargo loading/unloading station and availability of a consolidation station 126. In such examples, the storage may be based on a determination that the consolidation station 126 is not ready to receive the container. In some examples, the storage may be based on the time delay exceeding a threshold time interval (e.g., delay of 10 minutes, 15 minutes, etc.). For example, a ground shipment container 130 may be offloaded from a semi-trailer truck and processed through a ground cargo loading/unloading station 138. Based on an indication that a consolidation station 126 associated with the ground shipment container 130 is not ready to receive the ground shipment container 130 and will not be ready for more than a threshold time, the ground shipment container 130 may be moved to storage space 308(2) for temporary storage until the consolidation station 126 is ready to process the ground shipment container 130.

In various examples, the storage space(s) 308 may include markings associated with a particular location in which a container may be placed for storage. In such examples, the particular location of a stored container may be easily ascertainable by the centralized load planner, an air cargo operator, a drive unit, and/or a computing device associated with container transportation (e.g., air cargo operator computing device, human powered vehicle operator computing device, etc.). In various examples, responsive to placing a container in the storage space(s) 308, the particular location associated therewith may be uploaded to the centralized load planner for tracking purposes. For example, an air cargo operator, drive unit, and/or computing device associated with container transportation may receive an instruction, such as from the centralized load planner, to store a container at a particular location. Responsive to receiving the instruction, the air cargo operator, drive unit, and/or human powered vehicle operator may move the container to the particular location and send a message to the centralized load planner that the container is stored. Based on a determination that the container may be moved from the storage space 308, the same or a different air cargo operator, drive unit, and/or computing device associated with container transportation may receive a second instruction to move the container to a follow-on location, such as a cargo loading/unloading station, consolidation station 126, or the like, for further processing.

Figure 4:
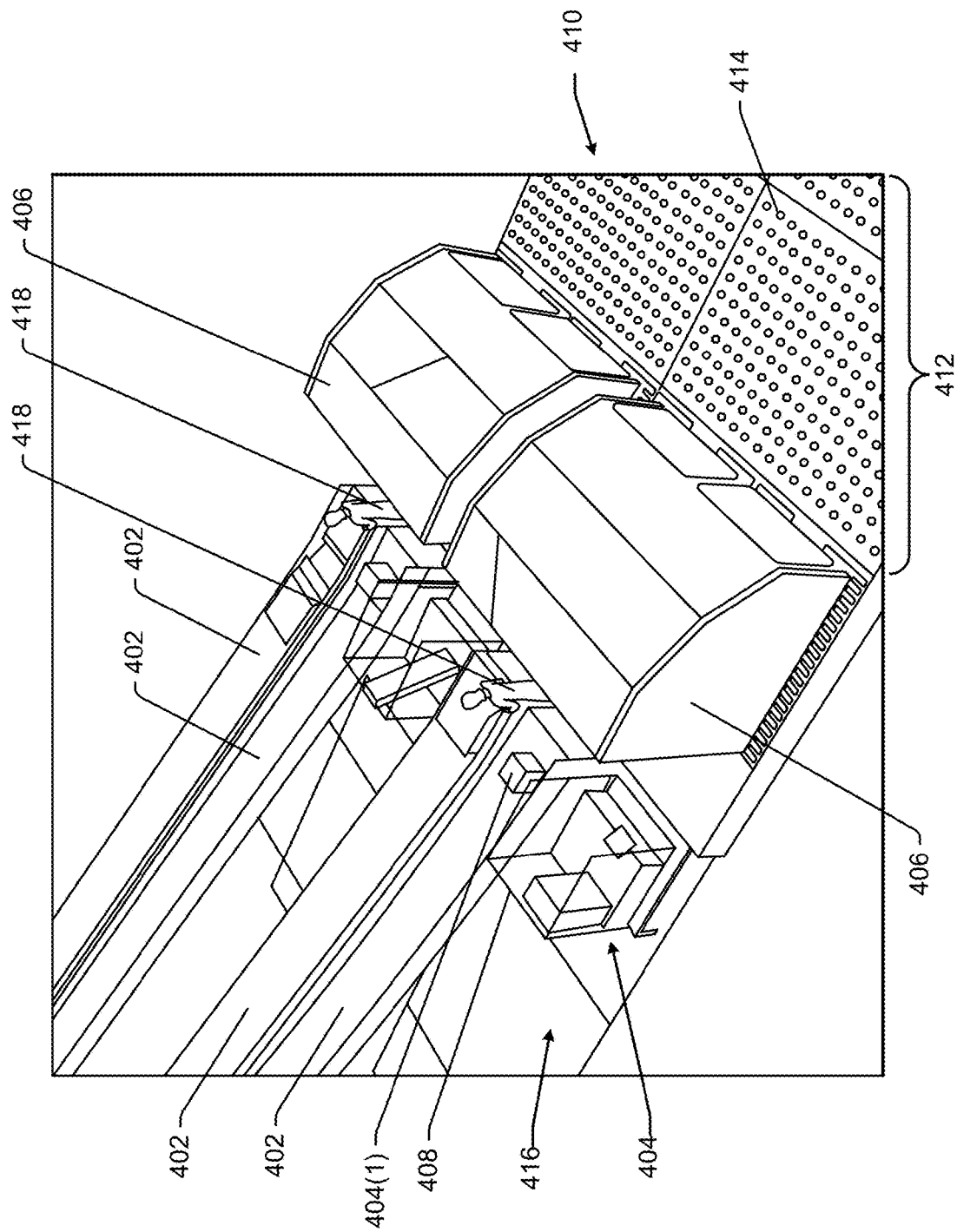
FIG. 4 illustrates an example conveyor loading station including two first-to-second floor conveyors configured to transfer packages to a second floor for sortation.

FIG. 4 illustrates an example conveyor loading station 400 including a plurality of first-to-second floor conveyors 402, such as first-to-second floor conveyor(s) 106, configured to transfer packages 404, such as packages 146, from a first floor of a transfer facility, such as first floor 102 and 300, to a second floor, such as second floor 104 and 200, for sortation. Though illustrated as having four first-to-second floor conveyors 402, the conveyor loading station 400 may include a greater or lesser number of first-to-second floor conveyors 402. The first-to-second floor conveyors 402 may include belt conveyors, powered roller conveyors, vertical conveyors, such as elevators, or a combination of the foregoing.

The conveyor loading station 400 may be configured for one or more ULDs 406 and/or one or more ground shipment containers 408. The ULD(s) 406 and the ground shipment container(s) 408 may be delivered to the conveyor loading station 400 based on a determination that the ULD(s) 406 and the ground shipment container(s) 408 include packages bound for multiple destinations (e.g., multi-destination containers). The ULD(s) 406 may be delivered to the conveyor loading station 400 across a first portion 410 of a surface of the first floor. The first portion 410 of the surface of the first floor may be configured to facilitate movement of the ULD(s) 406. In the illustrative example, the first portion 410 includes ball decking 412 comprising a plurality of omni-directional balls 414 (e.g., steel balls, ball bearings, etc.) configured to facilitate movement of the ULD(s) 406. Additionally or alternatively, the first portion 410 may include roller decking to facilitate movement of the ULD(s) 406. The roller decking may include a plurality of bi-directional rollers configured to facilitate movement of the ULD(s) 406. In various examples, the first portion may include caster decking to facilitate movement of the ULD(s) 406. In such examples, the caster decking may include one or more wheels coupled to the surface of the first floor via rotating casters.

The ground shipment container(s) 408 may be delivered to the conveyor loading station 400 across a second portion 416 of a surface of the first floor. The second portion 416 of the surface of the first floor may be configured for drive units and/or other vehicles (e.g., human powered, autonomous, semi-autonomous, etc.) to operate on. For example, the second portion 416 may include markings embedded into, etched, painted on, or the like, to assist the drive units and/or other vehicles in navigation across the second portion.

A conveyor loader 418, such as conveyor loader 144, may remove packages 404, such as package 404(1) from a ULD 406 or a ground shipment container 408 and place the package 404(1) on a first-to-second floor conveyor 402. As discussed above, the package 404(1) may be transported via the first-to-second floor conveyor 402 to the second floor for sortation. In the illustrative example, the conveyor loading station 400 includes two conveyor loaders 418; however greater or lesser number of conveyor loaders 418 may be contemplated. In some examples, a number of conveyor loaders 418 may be based on a time of day, day of the week, or other scheduling considerations. For example, the conveyor loading station 400 may include six conveyor loaders 418 between 8 am and 8 pm and four conveyor loaders 418 between 8 pm and 8 am.

Figure 5:
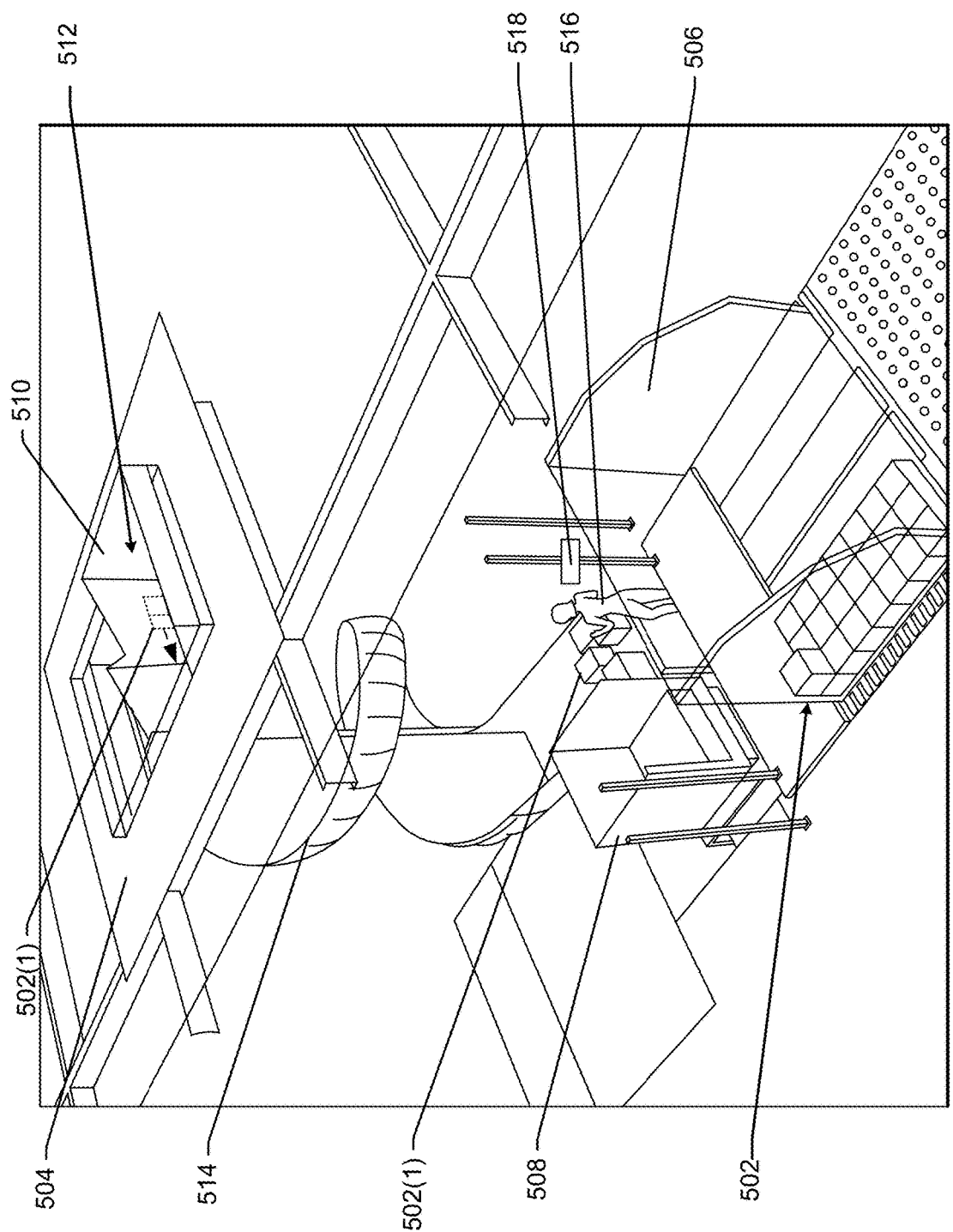
FIG. 5 illustrates an example consolidation station configured to receive packages from a second floor and consolidate the packages for shipment via ground or air transportation.

FIG. 5 illustrates an example consolidation station 500, such as consolidation station 126, configured to consolidate packages 502 received from a second floor 504 (e.g., sortation floor), such as second floor 104 and 200, for shipment via ground or air transportation. The consolidation station 500 may be configured to consolidate packages 502 bound for a particular destination (e.g., destination).

In some examples, the consolidation station 500 may be configured to consolidate packages bound for the destination via a particular mode of transportation. In such examples, the consolidation station 500 may be configured with one or more containers specific to the particular mode of transportation (e.g., one or more ULDs for air transportation or one or more ground shipment containers for ground transportation, etc.). In the illustrative example, the consolidation station 500 is configured to consolidate packages bound for the destination via air and/or ground. As such, the consolidation station is configured with a ULD 506, such as ULD 112, and a ground shipment container 508, such as ground shipment container 130.

As discussed above, a drive unit (not illustrated) may deliver a package 502, such as package 502(1) to a chute 510 corresponding to the consolidation station 500. The drive unit may release the package 502(1) into an insertion point 512 of the chute 510. In various examples, the drive unit may lift the package, such as via one or more robotic arms, and place the package 502(1) into the insertion point 512 of the chute. In some examples, the drive unit may be configured to raise a portion of a surface of the drive unit on which the package 502(1) may rest during transit, such as to cause the package 502(1) to slide off the drive unit and into the insertion point 512 of the chute 510.

In the illustrative example, the chute 510 is coupled to a slide 514 to assist in the movement of the package 502(1) from the second floor 502(1) to the consolidation station 500. Though illustrated as a spiral slide 514, the slide 514 may include an angled slide, a conveyor (e.g., angled, vertical, etc.), or any other means by which a package may be transferred from a first location on a second floor to a second location on a first floor. In various examples, the package 502(1) may travel, such as with gravity assist, down the slide 514 to the consolidation station 500.

A package consolidator 516 may receive the package 502(1) at the base of the slide 514. In various examples, the package consolidator 516 may determine a mode of transportation of the package. In examples in which the consolidation station 500 is configured for consolidating packages for a single mode of transportation (e.g., ground or air), the package consolidator 516 may determine that packages received via the slide 514 are associated with the mode of transportation. In various examples, the package consolidator 516 may scan or otherwise read a label on the package 502(1) to determine a mode of transportation for the package. The package consolidator 516 may place the package 502(1) into the ULD 506 or the ground shipment container 508 based on the mode of transportation.

In various examples, responsive to scanning the label, a consolidation computing device may present the mode of transportation and/or one or more characteristics (e.g., weight, contents (e.g., solid items, liquids, hazardous material, etc.), value (e.g., MSRP value, replacement value, insured amount, etc.) of the package on a display 518. Additionally or alternatively, the consolidation computing device may present characteristics associated with the ULD 506 and/or ground shipment container 508 (e.g., total weight, total value, presence of hazardous materials, etc.) on the display 518.

In various examples, the consolidation computing device may be configured to determine whether the container is within a threshold capacity and/or is at capacity. A determination of container capacity may be based on one or more maximum characteristics (e.g., maximum weight, maximum value, etc.). In some examples, the maximum characteristic(s) may be based on a type of container. In such examples, ULDs 506 may have an associated first set of one or more maximum characteristics and the ground shipment containers 508 may have an associated second set of one or more characteristics. In some examples, the maximum characteristic(s) may be specific to a specific ULD 506 and/or a specific ground shipment container 508. In such examples, the maximum characteristic(s) may be determined based on a vessel (e., airplane, semi-trailer truck) designated to transport the ULD 506 or ground shipment container 508, such as based on weight and/or balance considerations, a capability of a receiving facility (e.g., facility at the destination), or the like.

In various examples, the consolidation computing device may be configured to present the capacity of the ULD 506 and/or the ground shipment container 508 on the display 518. In some examples, the capacity presentation may include a percentage of full capacity. In some examples, the capacity may be color coded, such as based on the percentage and/or threshold capacity values. For example, a ULD 506 that is equal to or below a first threshold capacity at a first time may include a corresponding capacity display in green. Based on a determination that, at a second time, the ULD 506 capacity increases above the first threshold capacity and is below a second threshold capacity, the consolidation computing device may display the corresponding capacity in yellow. Based on a determination that, at a third time, the ULD 506 capacity is within a third threshold or has exceeded a maximum capacity, the consolidation computing device may display the corresponding capacity in red.

In some examples, based on a determination that the ULD 506 and/or the ground shipment container 508 is at or within a threshold amount and/or percentage of capacity, the consolidation computing device may present a notification (e.g., instruction) to the package consolidator 516 to prepare the respective container for transportation. In some examples the package consolidator 516 may visually determine that the ULD 506 and/or the ground shipment container 508 is at capacity, such as based on a lack of space to fit additional packages 502. Based on the determination that the ULD 506 and/or the ground shipment container 508 is at capacity and/or the notification, the package consolidator 516 may secure the ULD 506 and/or the ground shipment container 508 and prepare the respective container for transportation.

In some examples, the package consolidator 516 may send a notification, such as via the consolidation computing device, that the ULD 506 and/or ground shipment container 508 is prepared for transportation. In such examples, the notification may be sent to the centralized load planner, an air cargo operator, a drive unit, and/or a computing device associated with another vehicle for ground shipment container transportation. Based on receiving the notification (directly from the consolidation computing device or via the centralized load planner), the air cargo operator may deliver the ULD 506 from the consolidation station 500 to an air cargo loading/unloading station and/or the drive unit and/or the other vehicle may deliver the ground shipment container 508 from the consolidation station 500 to a ground cargo loading/unloading station.

Figure 6:
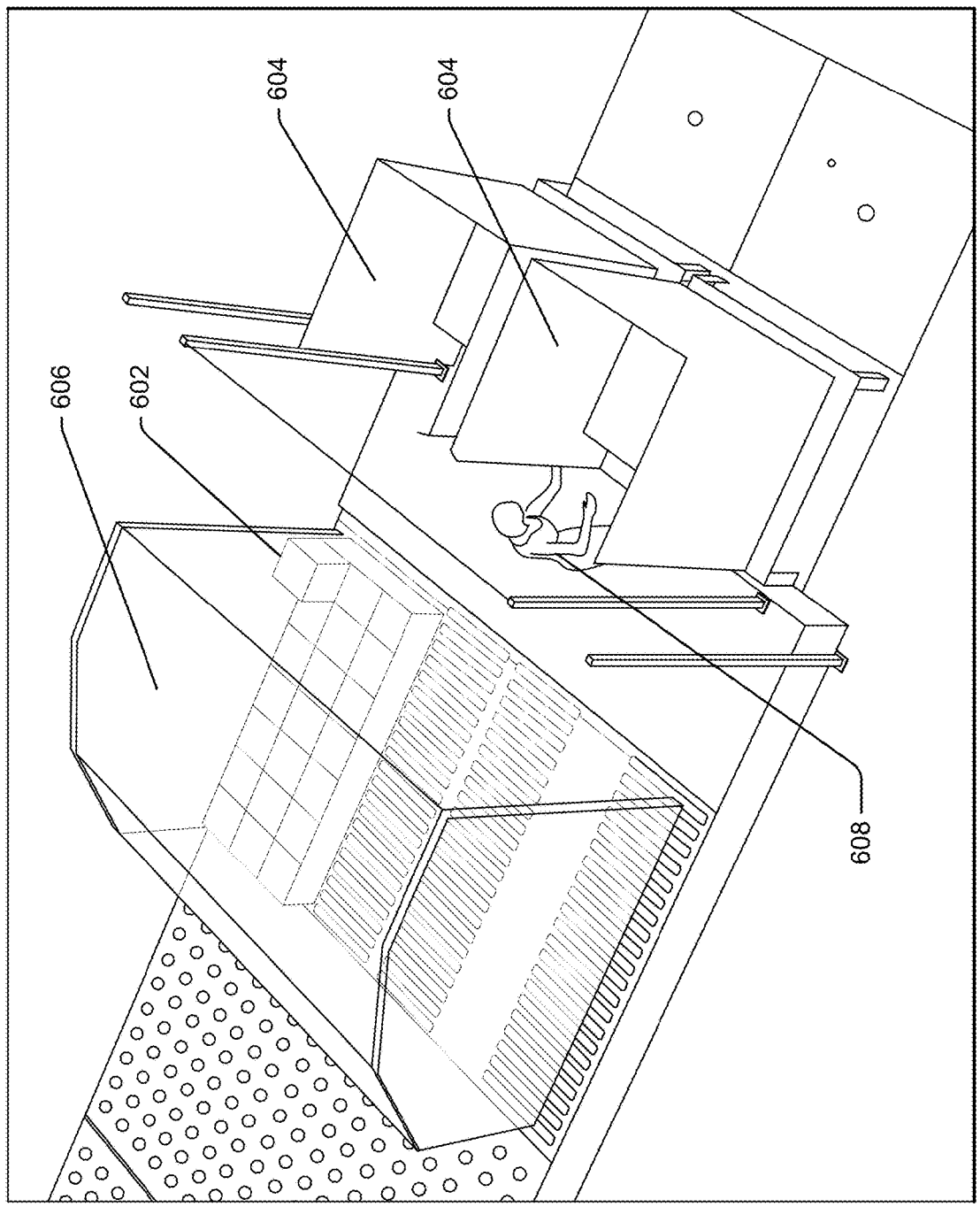
FIG. 6 illustrates an example consolidation station configured for transferring packages between single destination containers.

FIG. 6 illustrates an example consolidation station 600 configured for transferring packages 602, such as packages 146, between single destination containers. The consolidation station 600 may be configured to accept one or more ground shipment containers 604, such as ground shipment container 130, and a ULD 606, such as ULD 112. In various examples, the ground shipment containers 604 and the ULD 606 may be delivered to the consolidation station 600 based on a determination that the ground shipment container 604 or the ULD 606 includes packages bound for a single destination (e.g., single destination container). For example, a ground cargo operator may receive a ground shipment container 604 at a ground cargo loading/unloading station and may determine that the packages in the ground shipment container 604 are bound for the same destination via air transportation. The ground cargo operator may thus cause the ground shipment container 604 to be delivered to the consolidation station 600 for package transfer to a ULD 606. For another example, an air cargo operator may receive a ULD 606 at an air cargo loading/unloading station and may determine that the packages in the ULD 606 are bound for the same destination via ground transportation. The air cargo operator may thus cause the ULD 606 to be delivered to the consolidation station 600 for package transfer to the ground shipment container 604.

A package consolidator 608, such as package consolidator 128(1), 128(2), 128(3), etc., may remove packages 602 from a first single destination container, such as a ULD 606, and place the packages 602 in a second single destination container, such as ground shipment container 604. In various examples, the package consolidator 608 may scan a label associated with package 602 being loaded into a the ULD 606 or the ground shipment container 604. In such examples, a consolidation computing device may be configured to monitor the contents and/or one or more characteristics (e.g., weight, value, items, etc.) of the ULD 606 or ground shipment container 604. In various examples, the consolidation computing device may determine a capacity of the ULD 606 or the ground shipment container 604. In some examples, the consolidation computing device may be configured to present the capacity (e.g., percentage of full capacity, within a threshold of maximum capacity, etc.) on a display for the package consolidator 608. In various examples, the consolidation computing device may send data corresponding to the packages 602 loaded into a particular container, such as the ULD 606 or a ground shipment container 604, to a centralized load planner.

Figure 7:
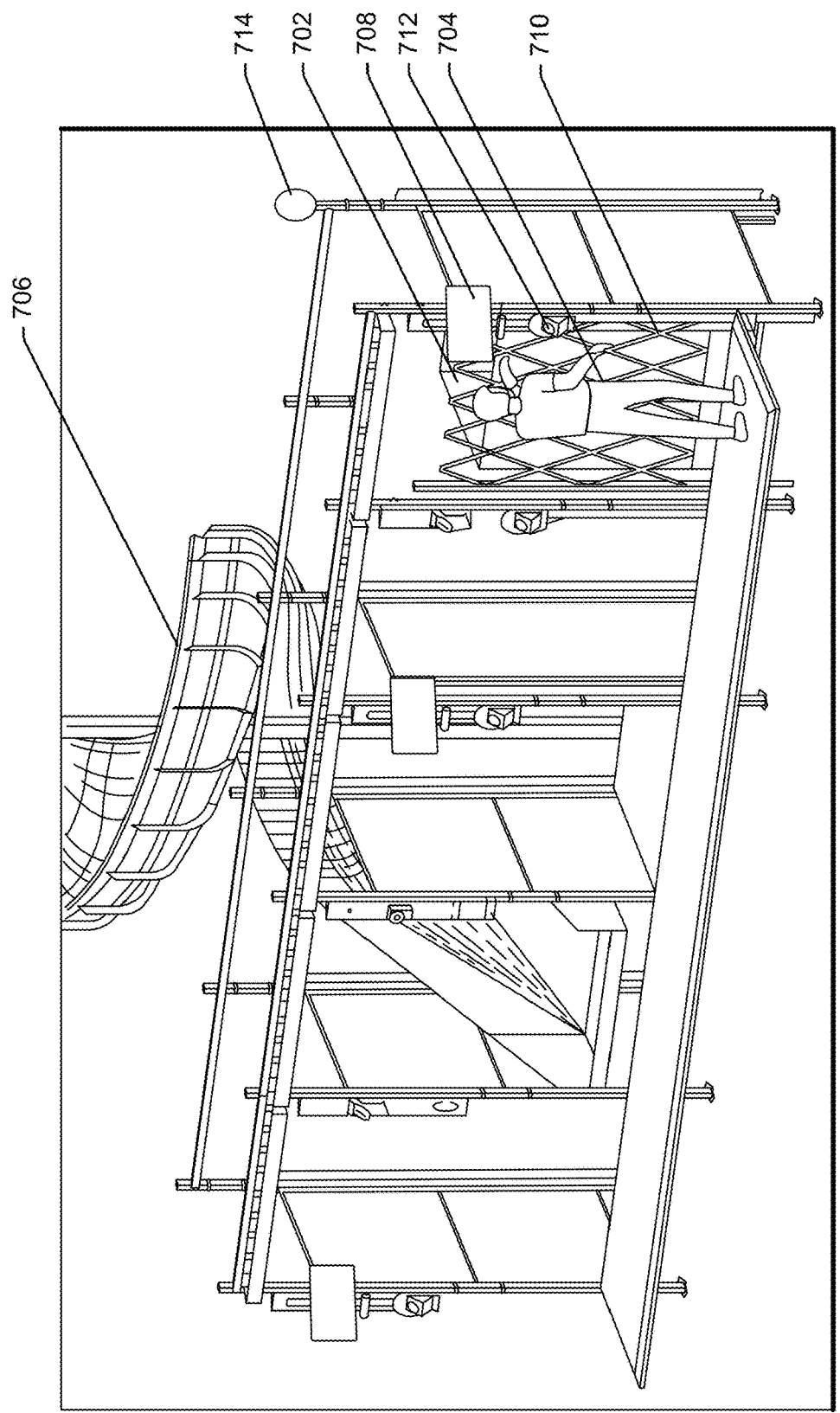
FIG. 7 illustrates an example consolidation station including a container at capacity.

FIG. 7 illustrates an example consolidation station 700 with a ground shipment container 702, such as ground shipment container 130, at capacity. In various examples, the package consolidator 704, such as package consolidator 128(1), 128(2), 128(3), etc., may load packages into the ground shipment container 702. The packages may be delivered to the consolidation station 700 via the slide 706, such as slide 158, from a second floor (e.g., sortation floor) of a transfer facility to a first floor at which the consolidation station 700 is located.

In various examples, based on an arrival of the package at the consolidation station, the package consolidator 704 may scan a label associated with the package, such as using an input/output device associated with a consolidation computing device. In such examples, the consolidation computing device may be configured to process data associated with the label (and the package) and determine one or more characteristics associated with the package. In some examples, package consolidator 704 may place packages that arrive via the slide 706 into a particular ground shipment container 702. The ground shipment container 702 may be determined by the consolidation computing device, the central load planner, or by choice of the package consolidator 704. In some examples, the consolidation computing device and/or the central load planner may cause a presentation on a display 708 of the particular ground shipment container 702 into which the package consolidator is to load packages. Based on a scan of each package prior to or substantially concurrently with (e.g., within a threshold time, such as within 10 seconds, etc.) loading the package into the ground shipment container 702, the consolidation computing device and/or the central load planner may monitor contents and/or characteristics associated with the ground shipment container 702.

In various examples, such as those in which a package consolidator 704 may choose between multiple ground shipment containers 702, the package consolidator 704 may scan a label associated with the ground shipment container 702, substantially concurrently with loading the package into the ground shipment container 702. In such examples, the consolidation computing device may be configured to monitor the contents and/or characteristics associated with the ground shipment container 702.

In various examples, the package consolidator 704 may determine that the ground shipment container 702 is at capacity. In various examples, the package consolidator 704 may determine the ground shipment container is at capacity based on a lack of space remaining in the ground shipment container (e.g., insufficient space to hold an additional package). In some examples, the package consolidator 704 may determine the ground shipment container 702 is at capacity based on one or more characteristics associated with the ground shipment container 702. In some examples, the one or more characteristics may include maximum characteristics, such as maximum weight, maximum value, etc. The characteristic(s) may be monitored by the consolidation computing device and/or the centralized load planner. In some examples, the consolidation computing device and/or centralized load planner may cause the characteristic(s) to be presented on the display 708. In the illustrated example, the display 708 is associated with the particular ground shipment container 702. In other examples, the display 708 may provide a presentation of data associated with multiple ground shipment containers and/or ULDs.

Based on a determination that the ground shipment container 702 is at capacity, the package consolidator 704 may prepare the ground shipment container 702 for transfer to a ground cargo loading/unloading station. In some examples, the package consolidator 704 may prepare the ground shipment container 702 by securing a top and/or side wall of the ground shipment container 702 to ensure the packages remain secure therein. In some examples, package consolidator 704 may prepare the ground shipment container 702 by closing an access 710 to the ground shipment container 702. In the illustrative example, the access 710 includes an accordion-style fence.

In various examples, access 710 may include a switch that, upon closure, sends a notification to the central load planner and/or a drive unit or computing device associated with another vehicle. The notification may provide an indication that the ground shipment container 702 is ready for transportation to a ground cargo loading/unloading station. In some examples the notification may include the location of the ground shipment container 702, such as a location associated with the access 710, and/or a location associated with the ground cargo loading/unloading station. In some examples, the notification may include a path to transit between locations.

In various examples, the package consolidator may send the notification via the consolidation computing device. In such examples, the package consolidator 704 may indicate on a user interface of the consolidation computing device that the ground shipment container 702 is secure and ready for transport. Based on the indication, the consolidation computing device may send the notification to the central load planner and/or a drive unit or computing device associated with another vehicle. In some examples, the consolidation station 700 may have a button 712 associated with each ground shipment container 702 and/or each ULD (not illustrated) located at the consolidation station 700. In some examples, the button 712 may comprise an input/output device associated with the consolidation computing device and/or other computing device. In some examples, the button 712, upon activation, may send a notification to the central load planner and/or a drive unit or computing device associated with another vehicle indicating that the ground shipment container is secure and ready for transportation. In some examples, the button 712 may activate a light 714 or other signal to indicate to an observer that the ground shipment container is secure and ready for transportation.

Figure 8:
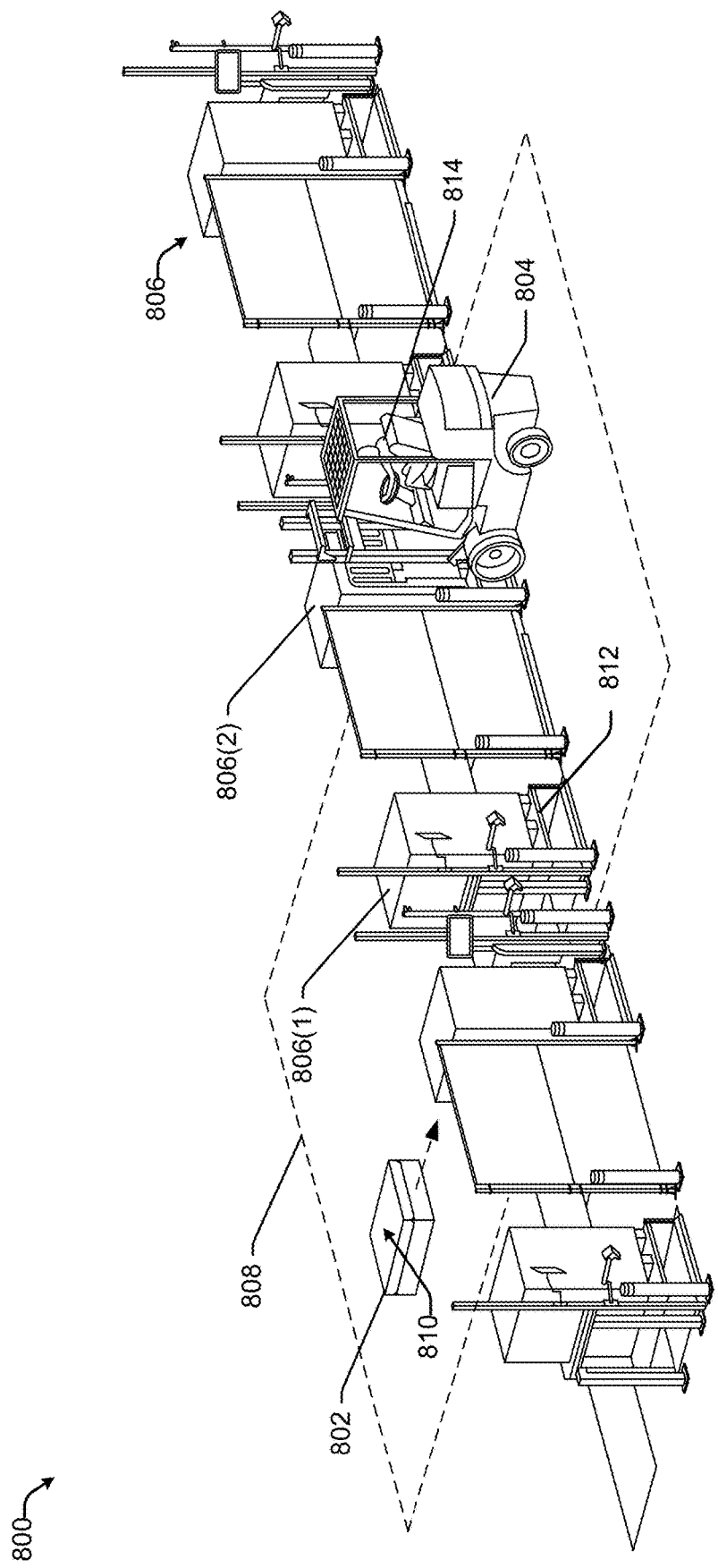
FIG. 8 illustrates an example environment in which a drive unit and a vehicle may move ground shipment containers to and from a consolidation station.

FIG. 8 illustrates an example environment 800 in which a drive unit 802 and a vehicle 804 may move ground shipment containers 806(1) and 806(2), respectively, to and from a station 808. In various examples, the station 808 may include a consolidation station, such as consolidation station 126(3). In some examples, the station 808 may include a ground cargo loading/unloading station, such as ground cargo loading/unloading station 138. In the illustrative example, the drive unit 802 and the vehicle 804 may be configured to operate on opposite sides of the station 808. In other examples, the drive unit 802 and the vehicle 804 may be configured to operate on a same side of the station 808.

The drive unit 802 may include an autonomous vehicle configured to carry at least one ground shipment container 806(1), such as ground shipment container 130. The drive unit 802 may include a computing system capable of communicating with a centralized load planner, a consolidation computing device, a computing device associated with a ground cargo operator, and/or any other computing devices utilized in the transfer facility (e.g., induction computing device, etc.). The drive unit 802 may be configured to navigate throughout a transfer facility, such as on a second portion of a surface of a first floor, such as second portion 110 of the first floor 102, and/or on a surface of a second floor, such as surface 202 of second floor 200.

In various examples, the drive unit 802 may be configured to navigate to a position under the ground shipment container 806(1) at the station 808. In some examples, the drive unit 802 may navigate into the position based on an indication and/or notification that the ground shipment container 806(1) is ready for transport. In some examples, from the position, the drive unit 802 may vertically extend a carrying surface 810 of the drive unit 802 until it is securely coupled to the ground shipment container 806(1). In at least one example, the drive unit 802 may vertically extend a carrying surface 810 of the drive unit 802 until it is securely coupled to a pod 812. The pod 812 may include a uniform interface between the drive unit 802 and the ground shipment container 806(1). In various examples, the pod 812 may enable the drive unit 802 to transport containers of different shapes and/or sizes. In some examples, the carrying surface 810 may include one or more frictional surfaces (e.g., rubber, plastic, etc.) configured to prevent the pod 812 or ground shipment container 806(1) from moving on the carrying surface 810 during transit. Based on an indication that the ground shipment container 806(1) is secure on the drive unit, the drive unit may navigate to a second location in the transfer facility, such as that associated with a ground cargo loading/unloading station.

In various examples, the vehicle 804 may be configured to transport one or more ground shipment containers 806, such as ground shipment container 806(2) from the station 808 to a ground cargo loading/unloading station. As illustrated in FIG. 8, the vehicle 804 may be manned, such as by an operator 814. In some examples, the vehicle 804 may be autonomous or semi-autonomous. In the illustrative example, the vehicle 804 is configured with a front-mounted lifting device for lifting and carrying the ground shipment container 806(2). In some examples, the vehicle 804 may be configured with rear-mounted lifting devices, side lifting devices, top lifting devices, or the like.

In various examples, based on receiving a notification and/or indication that the ground shipment container 806(2) is ready for transport, the vehicle 804 may navigate to a location associated with the ground shipment container 806(2) in the station 808. In some examples, the operator 814 may determine a path of travel to and/or from the location. In some examples, a centralized load planner may determine the path of travel to and/or from the location. In such examples, the centralized load planner may provide the path to a computing device associated with the vehicle 804. In some examples, the computing device associated with the vehicle 804 may present the path on a display for the operator 814 to view. In examples in which the vehicle 804 is an autonomous vehicle, the computing device associated with the vehicle 804 may cause one or more drive units to operate along the path to and/or from the location.

The vehicle 804 may secure the ground shipment container 806(2) via the lifting device. Based on an indication that the ground shipment container 806(2) is secure, the vehicle may traverse the second portion of the surface of the first floor to deliver the ground shipment container 806(2) to a ground cargo loading/unloading station.

Figure 11:
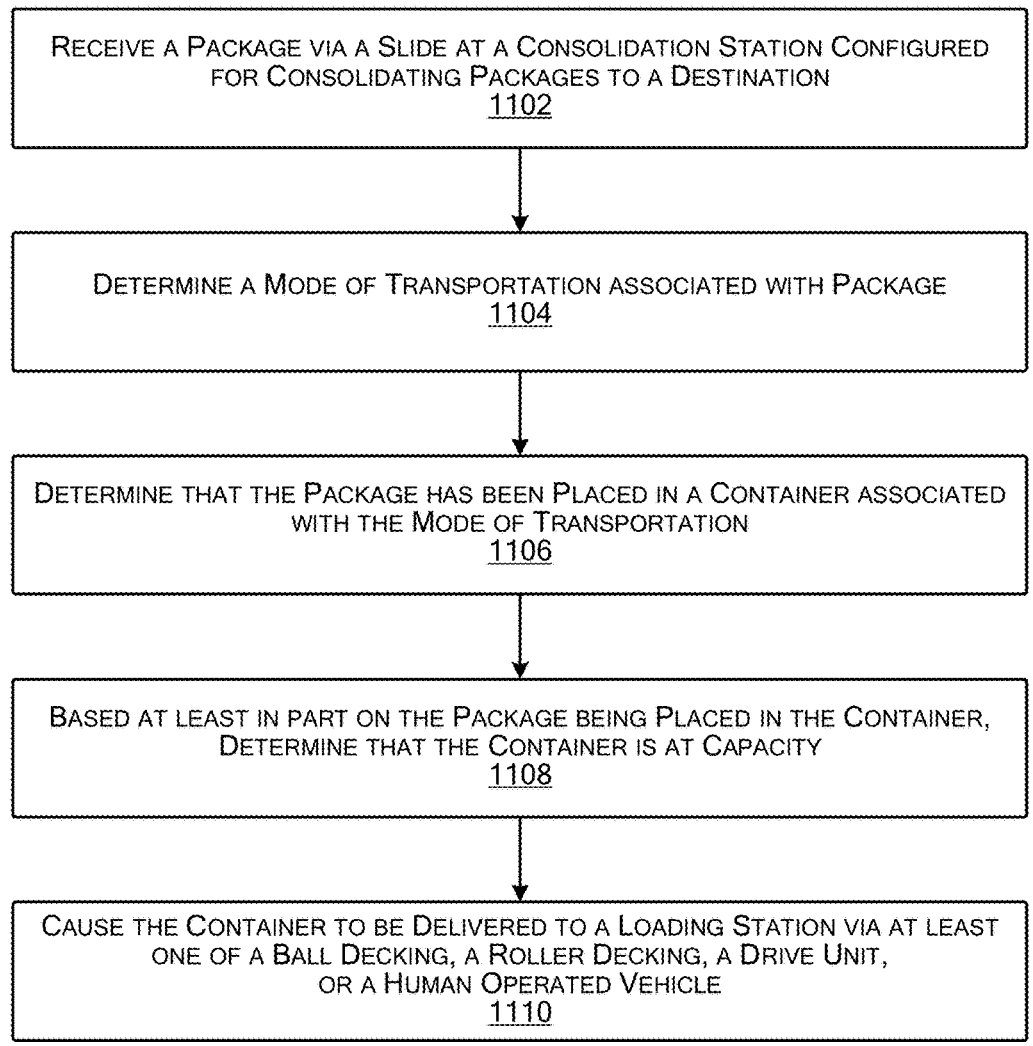
FIG. 11 illustrates a flow diagram of an example process for consolidating packages into a container based on a destination and a mode of transportation associated therewith.

FIGS. 9-11 illustrate various processes related to moving packages through a transfer facility configured with an optimized package transfer system. The processes described herein are illustrated as collections of blocks in logical flow diagrams, which represent a sequence of operations. In various examples, some or all of the operations may be performed by one or more humans and/or robots. In some examples, some or all of the operations may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and user interfaces described in the examples herein, such as, for example those described with respect to FIGS. 1-8, although the processes may be implemented in a wide variety of other environments, architectures, user interfaces, and systems.

FIG. 9 illustrates a process 900 for transferring packages from a multi-destination container to a single destination container for transportation to a destination. Some or all of the steps of the process 900 may be performed by one or more of the computing devices illustrated in FIG. 13.

At block 902, the process includes determining that a first container at a first location on a first floor of a transfer facility includes a plurality of packages bound for a plurality of destinations. The first location may include a location associated with a cargo loading/unloading station, such as ground cargo loading/unloading station 138 or air cargo loading/unloading station 118.

The first container may include a unit load device or other container configured for shipment via air transportation or a ground shipment container configured for shipment via ground transportation. In various examples, a determination that the plurality of packages located in the first container are bound for the plurality of destinations may be based on an indication on a label associated with the first container. In some examples, a cargo operator, such as a ground cargo operator or an air cargo operator, may scan a label into a computing device. The computing device may process data associated with the label and determine the plurality packages are bound for the plurality of destinations.

At block 904, the process includes delivering the first container to a second location associated with a conveyor configured to deliver packages from the first floor to a second floor of the transfer facility. In examples in which the first container includes a ULD or other container configured for air transportation, the first container may be delivered to the second location via a first portion of a surface of the first floor, such as first portion 108. The first portion may include ball decking, caster decking, roller decking, and/or any other type of decking configured to assist in container movement (e.g., caster wheel decking, etc.). In various examples, the first portion may include powered balls and/or rollers configured to move in a particular direction, such as directed by one or more drive units. In such examples, the particular direction may be determined by a centralized load planner or other computing system configured to cause the first container to be moved from the first location to the second location.

In various examples, the first portion may include non-powered balls, rollers, and/or caster wheels. In such examples, an air cargo operator may guide the ULD across the first portion from the first position to the second position. In various examples, the first portion may additionally include one or more frictional surfaces (sand infused flooring, rubber matting, etc.) to prevent the air cargo operator from slipping while operating on the first portion of the surface of the first floor.

In examples in which the first container includes a ground shipment container configured for ground transportation, the first container may be delivered to the second location via a second portion of the surface of the first floor, such as second portion 110. The first container may be delivered to the second location across the second portion via a drive unit or other vehicle configured to carry the ground shipment container, such as a human powered vehicle.

At block 906, the process includes delivering a package of the plurality of packages to the second floor via the conveyor. The conveyor may include a first-to-second floor conveyor, such as first-to-second floor conveyor(s) 106. In various examples, a conveyor loader, such as conveyor loader 144, may remove the package from the first container and place the package on the conveyor for delivery to the second floor. In various examples, the conveyor loader may load the package based on a determination that a size (e.g., height, width, length, etc.) of the package is below a threshold size (e.g., 35 inches, 40 inches, 94 centimeters, etc.). In some examples, the conveyor loader may load the package based on a determination that a weight associated with the package is below a threshold weight (20 kilograms, 40 pounds, etc.).

At block 908, the process includes delivering the package to an induction station located on the second floor, wherein a computing device at the induction station is configured to determine a destination associated with the package. In various examples, the package may be delivered to the induction station via a substantially horizontal conveyor (e.g., conveyor with less than a 2-degree tilt, 3% grade, or the like). In some examples, the substantially horizontal conveyor may be configured such that the package may transfer from the conveyor (e.g., first-to-second floor conveyor) to the substantially horizontal conveyor without human and/or robotic intervention. In some examples, a package loader may manually deliver the package to the induction station. In such examples, the package loader may be situated at the top of the conveyor (e.g., first-to-second floor conveyor) and may remove packages from the conveyor and carry the packages to induction stations.

In various examples, the package may be delivered to the induction station via a drive unit. In such examples, the package loader may remove packages from the conveyor and place them on the drive unit. In various examples, the package loader may program the drive unit to deliver the package to the induction station, such as by inputting an identifier associated with the induction station. In some examples, a centralized load planner may direct the drive unit to deliver the package to the induction station, such as by sending an instruction to the drive unit including the induction station and/or a path to transit thereto.

In some examples, the centralized load planner may identify the induction station based on a package backlog at each induction station. The package backlog may include a number of packages waiting to be processed through the induction station. In various examples, the package backlog may be determined based on perception data received from one or more sensors on the second floor (e.g., sortation floor). The one or more sensors may include camera systems, lidar, radar, or the like. In various examples, the centralized load planner may receive sensor data and determine a backlog associated with each induction station. The induction station for package delivery may be identified based a minimal package backlog (e.g., lowest number of packages to be processed. In various examples, the package backlog may be determined based on location and velocity data associated with a plurality of drive units operating on the second floor. In such examples, the centralized load planner may determine a number of drive units proximate each induction station with a velocity below a threshold (e.g., less than 5 miles per hour, less than 8 kilometers per hour, etc.). In some examples, the drive unit may be configured to determine the package backlog associated with each induction station, such as by communicating with one or more other drive units (e.g., determining locations associated therewith, etc.). In such examples, the drive unit may identify the induction station based on the package backlog.

In various examples, a package processor, such as package processor 152 may determine the destination associated with the package by scanning or otherwise reading a label associated with the package. The label may include a human-readable code identifying the destination (e.g., a three-letter identifier for an airport, etc.), and/or a digital code such as a QR code, a bar code, or the like. In various examples, the package processor 152 may scan the package using an input/output device associated with a computing device. Additionally, the package processor may determine the mode of transportation associated with the package. In some examples, the computing device may determine the mode of transportation based on data embedded in the digital code. In some examples, the package processor may determine the mode of transportation based on an indication printed on the package, such as "GROUND."

At block 910, the process includes identifying a chute associated with the destination, wherein the chute corresponds to a consolidation station configured for consolidating packages into containers bound for the destination. The chute may include an opening in the second floor, configured to receive packages for transfer to the consolidation station on first floor, such as via a slide.

In various examples, the computing device may process the data associated with the destination and/or mode of transportation and may identify the consolidation station configured for consolidating packages bound for the destination and/or via the mode of transportation. In such examples, the computing device may additionally identify the chute associated with the consolidation station. In various examples, the computing device may present data associated with the identified chute on a display for viewing by the package processor.

At block 912, the process includes causing a first drive unit to deliver the package to the consolidation station via the chute. In various examples, the package processor may place the package on the first drive unit for delivery to the chute. In some examples, the package processor may program the first drive unit to deliver the package to the chute. In some examples, the computing device may send the data associated with the chute (e.g., identifier) to the drive unit, such as based on processing the data embedded in the digital code of the label. In some examples, the drive unit may determine the path between a location associated with the induction station and a location associated with the chute. In some examples, the drive unit may be programmed with pre-determined paths to traverse across the second floor between locations. In some examples, the drive unit may dynamically determine the path based on one or more other drive units operating on the floor.

In various examples, the drive unit may be configured to stop at the second location associated with the chute for package transfer into the chute. The second location may be associated with an insertion point associated with the chute. The second location may be associated with a point at which the chute couples to a first end of the slide. The slide may include a spiral slide, a straight slide, a vertical conveyor, or other apparatus configured to utilize gravity and/or mechanical assist to transfer packages from the second floor to the first floor of the transfer facility.

In various example, based on a determination that the drive unit is at the second location, the drive unit may elevate a portion of a surface on which the package rests and cause the package to slide into the insertion point of the chute and down the slide. In some examples, based on a determination that the drive unit is at the second location, the drive unit may activate one or more robotic arms to lift the package from the surface on which the package rests and insert the package into the chute.

At block 914, the process includes determining that the package is associated with a second container bound for the destination. A package consolidator may receive the package delivered via the chute and determine a mode of transportation associated with the package. In some examples, the consolidation station may be configured for a single mode of transportation. In such examples, the package consolidator may determine the mode of transportation based on the arrival of the package at the consolidation station. In some examples, the consolidation station may be configured for more than one mode of transportation. In such examples, the package consolidator may determine the mode of transportation such as by scanning or otherwise reading the label located on the package, such utilizing a computing device.

In various examples, the mode of transportation may be presented on a display in the consolidation station. In various examples, based on a determination of the mode of transportation, the package consolidator may insert the package into the second container bound for the destination via the mode of transportation. In various examples, the package consolidator may scan a label associated with the second container or otherwise input an indication that the package is associated with the second container (e.g., package inserted into the second container). In various examples, the computing device may identify characteristics associated with the package and/or the second container. In such examples, the computing device may determine the characteristics based on data embedded in the digital code on the label. In various examples, the computing device may send the characteristics associated with the package and/or the second container to the centralized load planner. In such examples, the centralized load planner may be configured to monitor a location of the package, contents of the second container, characteristics associated with the second container, or the like.

At block 916, the process includes determining that the second container is at capacity. In various examples, a determination that the second container is at capacity is based on the package consolidator determining that no further packages may fit into the second container (e.g., insufficient space to include an additional package). In some examples, a determination that the second container is at capacity is based on a determination that one or more maximum characteristics associated with the second container are met or within a threshold value of being met. Based on a determination that the second container is at capacity, the package consolidator may secure the second container for shipment.

At block 918, the process includes delivering the second container to a loading station via at least one of a ball decking, a caster decking, a roller decking, a second drive unit, or a human operated vehicle. In various examples, based on a determination that the second container is at capacity and/or prepared for shipment, the package consolidator, such as via the computing device may send a notification that the centralized load planner indicating that the second container is ready to be moved to the loading station.

In examples in which the second container is a ULD or other container configured for air transportation, the ULD may be delivered to the loading station via the first portion of the floor, such as by an air cargo operator and/or powered ball decking, caster decking, roller decking, or the like. In some examples, the centralized load planner and/or the computing device may send a notification to the air cargo operator to deliver the ULD from a location associated with the ULD in the consolidation station to the loading station. In some examples, the centralized load planner may cause the powered ball decking, caster decking, roller decking, or the like to activate based on the indication that the second container is ready to be moved to the loading station.

In examples in which the second container is a ground shipment container, the ground shipment container may be delivered to the loading station via a drive unit or another vehicle configured to transit across the second portion of the surface of the first floor. In some examples, the centralized load planner and/or the computing device may send a notification to the drive unit or a computing device associated with the other vehicle to deliver the ground shipment container from a location associated with the ground shipment container at the consolidation station to the loading station.

FIG. 10 illustrates a process 1000 for transferring packages from a first single-destination container configured for a first mode of transportation to a second single destination container for transportation to a destination via a second mode of transportation. Some or all of the steps of the process 1000 may be performed by one or more of the computing devices illustrated in FIG. 13.

At block 1002, the process includes determining that a first container configured for a first mode of transportation at a first location on a first floor of a transfer facility includes a plurality of packages to be transported to a destination via a second mode of transportation. The first location may include a location associated with a cargo loading/unloading station, such as ground cargo loading/unloading station 138 or air cargo loading/unloading station 118.

The first container may include a unit load device or other container configured for shipment via air transportation or a ground shipment container configured for shipment via ground transportation. In various examples, a determination that the plurality of packages located in the first container are bound for the destination may be based on an indication on a label associated with the first container. In some examples, a cargo operator, such as a ground cargo operator or an air cargo operator, may scan a label into a computing device. The computing device may process data associated with the label and determine the plurality packages are bound for the destination.

At block 1004, the process includes identifying a consolidation station associated with the destination and the second mode of transportation. In various examples, the computing device may process the data associated with the label to determine the consolidation station configured for consolidating packages bound for the destination via the mode of transportation. In some examples, the computing device may send data associated with the container to a centralized load planner and may receive a message indicating the consolidation station as being configured for consolidating packages bound for the destination via the mode of transportation.

At block 1006, the process includes delivering the first container to the consolidation station via at least one of a ball decking, caster decking, a roller decking, a drive unit, or a human powered vehicle. In examples in which the first container includes a ULD or other container configured for air transportation, the first container may be delivered to the consolidation station via a first portion of a surface of the first floor, such as first portion 108. The first portion may include ball decking, caster decking, roller decking, and/or any other type of decking configured to assist in container movement (e.g., caster wheel decking, etc.). In various examples, the first portion may include powered balls and/or rollers configured to move in a particular direction, such as directed by one or more drive units. In such examples, the particular direction may be determined by a centralized load planner or other computing system configured to cause the first container to be moved from the first location to the consolidation station.

In various examples, the first portion may include non-powered balls, rollers, and/or caster wheels. In such examples, an air cargo operator may guide the ULD across the first portion from the first position to the second position. In various examples, the first portion may additionally include one or more frictional surfaces (sand infused flooring, rubber matting, etc.) to prevent the air cargo operator from slipping while operating on the first portion of the surface of the first floor.

In examples in which the first container includes a ground shipment container configured for ground transportation, the first container may be delivered to the consolidation station via a second portion of the surface of the first floor, such as second portion 110. The first container may be delivered to the consolidation station across the second portion via a drive unit or other vehicle configured to carry the ground shipment container, such as a human powered vehicle.

At block 1008, the process includes determining that at least a portion of the plurality of packages have been placed into a second container configured for the second mode of transportation. In various examples, a package consolidator may scan or otherwise input data associated with each package placed into the second container into a computing device. In such examples, the computing device may monitor the contents of the second container.

At block 1010, the process includes determining that the second container is at capacity. In various examples, a determination that the second container is at capacity is based on the package consolidator determining that no further packages may fit into the second container (e.g., insufficient space to include an additional package). In some examples, a determination that the second container is at capacity is based on a determination that one or more maximum characteristics associated with the second container are met or within a threshold value of being met. Based on a determination that the second container is at capacity, the package consolidator may secure the second container for shipment.

At block 1012, the process includes delivering the second container to a loading station via the at least one of the ball decking, caster decking, the roller decking, the drive unit, or the human powered vehicle. In various examples, based on a determination that the second container is at capacity and/or prepared for shipment, the package consolidator, such as via the computing device may send a notification that the centralized load planner indicating that the second container is ready to be moved to the loading station.

In examples in which the second container is a ULD or other container configured for air transportation, the ULD may be delivered to the loading station via the first portion of the floor, such as by an air cargo operator and/or powered ball decking, caster decking, roller decking, or the like. In some examples, the centralized load planner and/or the computing device may send a notification to the air cargo operator to deliver the ULD from a location associated with the ULD in the consolidation station to the loading station.

In some examples, the centralized load planner may cause the powered ball decking, caster decking, roller decking, or the like to activate based on the indication that the second container is ready to be moved to the loading station.

In examples in which the second container is a ground shipment container, the ground shipment container may be delivered to the loading station via a drive unit or another vehicle configured to transit across the second portion of the surface of the first floor. In some examples, the centralized load planner and/or the computing device may send a notification to the drive unit or a computing device associated with the other vehicle to deliver the ground shipment container from a location associated with the ground shipment container at the consolidation station to the loading station.

FIG. 11 illustrates a process 1100 for consolidating packages into a container based on a destination and a mode of transportation associated therewith. Some or all of the steps of the process 1100 may be performed by one or more of the computing devices illustrated in FIG. 13.

At block 1102, the process includes receiving a package via a slide at a consolidation station configured for consolidating packages to the destination. As discussed above, the package may be delivered to a chute associated with the slide via a drive unit from a second floor (e.g., sortation floor) of a transfer facility. The package may be delivered via the slide based on a destination and/or mode of transportation associated with the package.

At block 1104, the process includes determining a mode of transportation associated with the package. In some examples, the consolidation station may be configured for a single mode of transportation. In such examples, the package consolidator may determine the mode of transportation based on the arrival of the package at the consolidation station. In some examples, the consolidation station may be configured for more than one mode of transportation. In such examples, the package consolidator may determine the mode of transportation such as by scanning or otherwise reading the label located on the package, such utilizing a computing device. In various examples, the mode of transportation may be presented on a display in the consolidation station.

At block 1106, the process includes determining that the package has been placed in a container associated with the mode of transportation. In various examples, based on a determination of the mode of transportation, the package consolidator may insert the package into the container bound for the destination via the mode of transportation. In various examples, the package consolidator may scan a label associated with the container or otherwise input an indication that the package is associated with the container (e.g., package inserted into the container). In various examples, the computing device may identify characteristics associated with the package and/or the container. In such examples, the computing device may determine the characteristics based on data embedded in the digital code on the label. In various examples, the computing device may send the characteristics associated with the package and/or the container to the centralized load planner. In such examples, the centralized load planner may be configured to monitor a location of the package, contents of the container, characteristics associated with the container, or the like.

At block 1108, the process includes determining that the container is at capacity based at least in part on determining that the package has been placed in the container. In various examples, a determination that the container is at capacity is based on the package consolidator determining that no further packages may fit into the container (e.g., insufficient space to include an additional package). In some examples, a determination that the container is at capacity is based on a determination that one or more maximum characteristics associated with the container are met or within a threshold value of being met. Based on a determination that the container is at capacity, the package consolidator may secure the second container for shipment.

At block 1110, the process includes causing the container to be delivered to a loading station via at least one of a ball decking, caster decking, a roller decking, a drive unit, or a human operated vehicle. In various examples, based on a determination that the container is at capacity and/or prepared for shipment, the package consolidator, such as via the computing device may send a notification that the centralized load planner indicating that the container is ready to be moved to the loading station.

In examples in which the container is a ULD or other container configured for air transportation, the ULD may be delivered to the loading station via the first portion of the floor, such as by an air cargo operator and/or powered ball decking, caster decking, roller decking, or the like. In some examples, the centralized load planner and/or the computing device may send a notification to the air cargo operator to deliver the ULD from a location associated with the ULD in the consolidation station to the loading station. In some examples, the centralized load planner may cause the powered ball decking, caster decking, roller decking, or the like to activate based on the indication that the container is ready to be moved to the loading station.

In examples in which the container is a ground shipment container, the ground shipment container may be delivered to the loading station via a drive unit or another vehicle configured to transit across the second portion of the surface of the first floor. In some examples, the centralized load planner and/or the computing device may send a notification to the drive unit or a computing device associated with the other vehicle to deliver the ground shipment container from a location associated with the ground shipment container at the consolidation station to the loading station.

Figure 12:
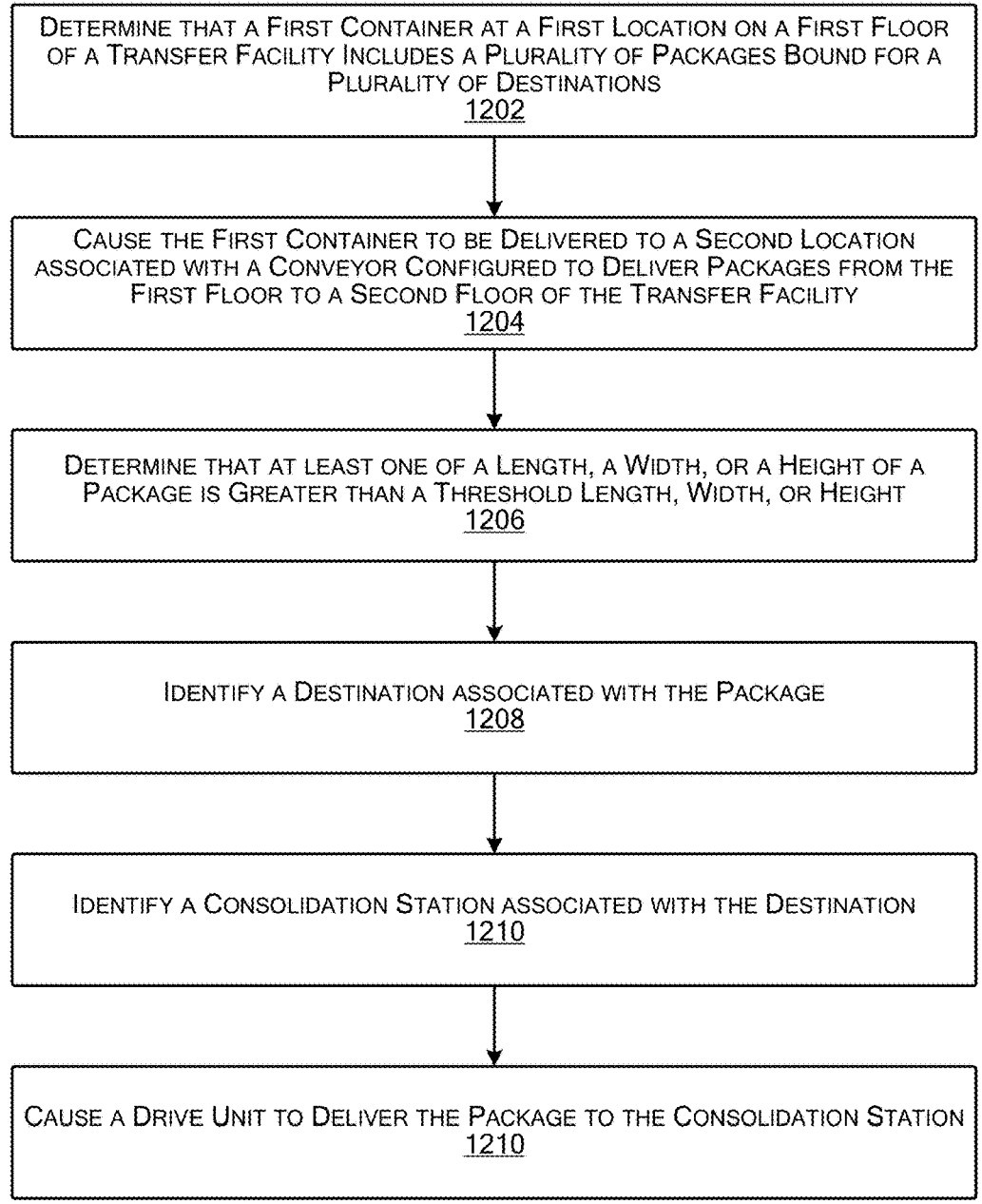
FIG. 12 illustrates a flow diagram of an example process for moving a package to a consolidation station based on a size of the package.

FIG. 12 illustrates a process 1200 for moving a package to a consolidation station based on a size of the package. Some or all of the steps of the process 1200 may be performed by one or more of the computing devices illustrated in FIG. 13.

At block 1202, the process includes determining that a first container at a first location on a first floor of a transfer facility includes a plurality of packages bound for a plurality of destinations. The first location may include a location associated with a cargo loading/unloading station, such as ground cargo loading/unloading station 138 or air cargo loading/unloading station 118.

The first container may include a unit load device or other container configured for shipment via air transportation or a ground shipment container configured for shipment via ground transportation. In various examples, a determination that the plurality of packages located in the first container are bound for the plurality of destinations may be based on an indication on a label associated with the first container. In some examples, a cargo operator, such as a ground cargo operator or an air cargo operator, may scan a label into a computing device. The computing device may process data associated with the label and determine the plurality packages are bound for the plurality of destinations.

At block 1204, the process includes causing the first container to be delivered to a second location associated with a conveyor configured to deliver packages from the first floor to a second floor of the transfer facility. In examples in which the first container includes a ULD or other container configured for air transportation, the first container may be delivered to the second location via a first portion of a surface of the first floor, such as first portion 108. The first portion may include ball decking, caster decking, roller decking, and/or any other type of decking configured to assist in container movement (e.g., caster wheel decking, etc.). In various examples, the first portion may include powered balls and/or rollers configured to move in a particular direction, such as directed by one or more drive units. In such examples, the particular direction may be determined by a centralized load planner or other computing system configured to cause the first container to be moved from the first location to the second location.

In various examples, the first portion may include non-powered balls, rollers, and/or caster wheels. In such examples, an air cargo operator may guide the ULD across the first portion from the first position to the second position. In various examples, the first portion may additionally include one or more frictional surfaces (sand infused flooring, rubber matting, etc.) to prevent the air cargo operator from slipping while operating on the first portion of the surface of the first floor.

In examples in which the first container includes a ground shipment container configured for ground transportation, the first container may be delivered to the second location via a second portion of the surface of the first floor, such as second portion 110. The first container may be delivered to the second location across the second portion via a drive unit or other vehicle configured to carry the ground shipment container, such as a human powered vehicle.

At block 1206, the process includes determining that at least one of a length, a width, or a height of a package is equal to or greater than a threshold length, width, or height. In various examples, a conveyor loader, such as conveyor loader 144, may remove the package from the first container and measure the package to determine that a size of the package (e.g., length, width, and/or height) is equal to or greater than a threshold size (e.g., 37 inches, 94 centimeters, 350 inches$^2$, 400 centimeters$^2$, etc.). In some examples, the conveyor loader may determine, such as by scanning or otherwise reading a label on the package, that the size of the package is equal to or greater than the threshold. Additionally or alternatively, the conveyor loader may determine that the package includes a weight that is equal to or greater than a threshold weight (20 kilograms, 40 pounds, etc.). Based on a determination that the at least one of the length, the width, or the height is equal to or greater than the threshold length, width, or height, and/or that the weight associated with the package exceeds a threshold weight, the conveyor loader may not place the package on the conveyor.

At block 1208, the process includes identifying a destination associated with the package. As discussed above, the conveyor loader may identify the destination by scanning or otherwise reading a label associated with the package. Additionally, the conveyor loader may identify a mode of transportation associated with the package. In various examples, the conveyor loader may identify the destination and/or the mode of transportation based on data decoded from a digital code on the label. In such examples, a computing device may receive the digital code and may provide information about the destination and/or mode of transportation to the conveyor loader, such as via a display of the computing device.

At block 1210, the process includes identifying a consolidation station associated with the destination. In some examples, the consolidation station may additionally be associated with the mode of transportation. In some examples, the computing device may process the data associated with the destination and/or mode of transportation to identify the consolidation station configured to consolidate packages bound for the destination and/or via the mode of transportation.

At block 1210, the process includes causing a drive unit to deliver the package to the consolidation station. The conveyor loader may place the package on the drive unit for delivery to the consolidation station. In some examples, the conveyor loader may program the drive unit to deliver the package to the consolidation station. In such examples, the conveyor loader may input an identifier associated with the consolidation station into a drive unit computing device. In some examples, the computing device may send the consolidation station information to the drive unit for package delivery. In such examples, based on a determination that the package has been placed on the drive unit, the drive unit may automatically transit across the second portion of the surface of the first floor to the consolidation station. In some examples, a centralized load planner may receive data associated with the package from the computing device associated with the conveyor loader and may send an instruction to the drive unit to deliver the package to the consolidation station.

Figure 13:
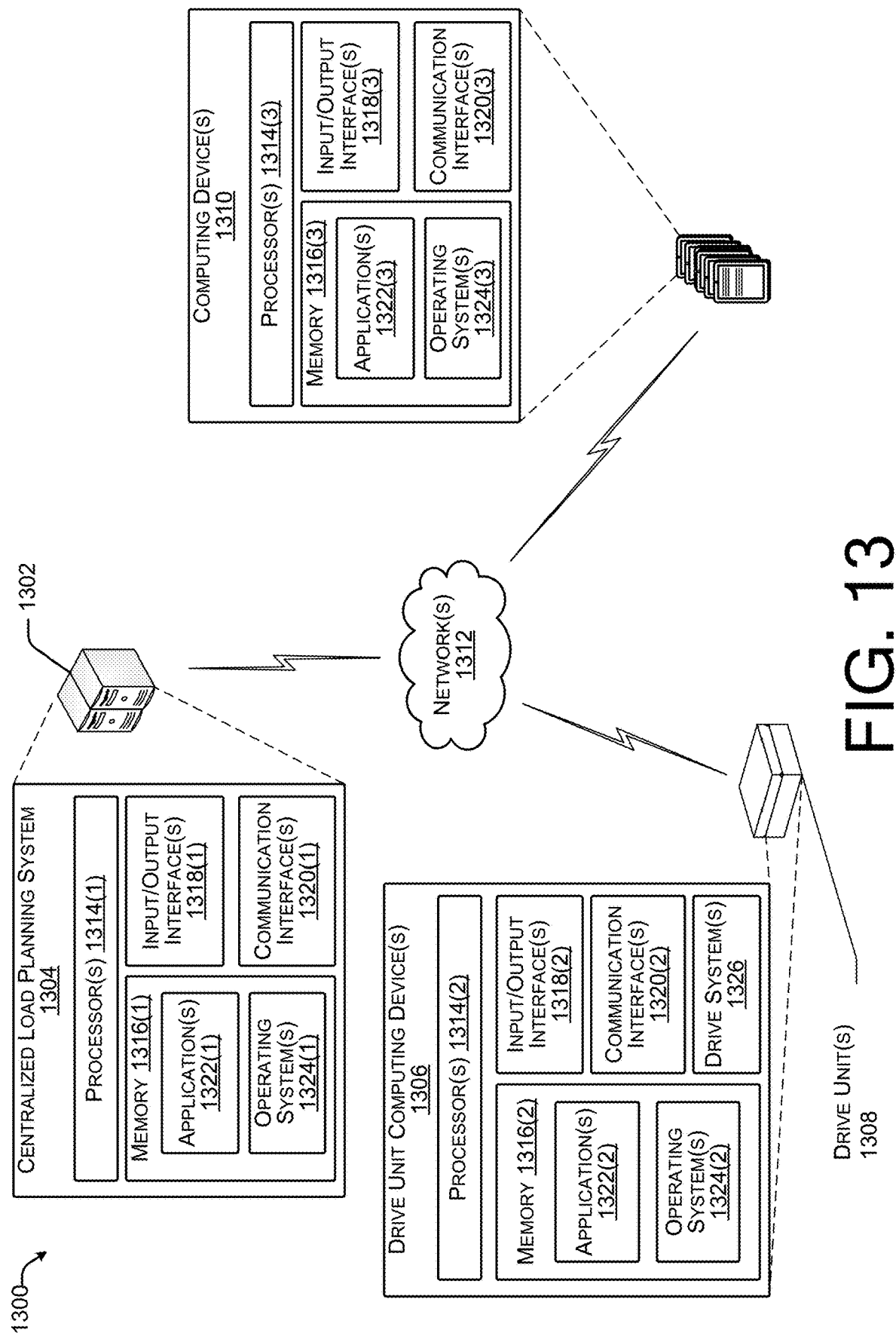
FIG. 13 illustrates an environment in which a plurality of computing devices may be used to facilitate the transfer of packages through a transfer facility.

FIG. 13 illustrates an example environment 1300 in which one or more computing devices may be utilized in a transfer facility. The computing device(s) may include one or more centralized load planning devices 1302 of a centralized load planning system 1304 (e.g., centralized load planner), a drive unit computing device 1306 associated with a drive unit 1308, and one or more other computing devices 1310. The other computing device(s) 1310 may include computing devices utilized at various stations in the transfer facility, such as an induction computing device, a consolidation computing device, a ground cargo operator computing device, an air cargo operator computing device, a drive unit computing device, a vehicle operator computing device, and one or more other package and/or container processing computing devices.

The centralized load planning system 1304, the drive unit computing device 1306, and the other computing device(s) 1310 may include any suitable types of computing devices, e.g., mobile, semi-mobile, semi-stationary, or stationary. The centralized load planning system 1304, the drive unit computing device 1306, and the other computing device(s) 1310 may belong to a variety of categories or classes of devices such as traditional server-type devices, desktop computer-type devices, mobile devices, special purpose-type devices, embedded-type devices, and/or wearable-type devices. Thus, centralized load planning system 1304, drive unit computing device 1306, and other computing device(s) 1310 may include a diverse variety of device types and are not limited to a particular type of device. For example, the centralized load planning system 1304, the drive unit computing device 1306, and the other computing device(s) 1310 may represent, but are not limited to, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device capable of sending communications and performing the functions according to the techniques described herein.

The centralized load planning system 1304, the drive unit computing device 1306, and the other computing device(s) 1310 may be configured to communicate with one another via a network 1312, such as to assist in monitoring movement of packages throughout the transfer facility. The network 1312 may include the Internet, cable networks, cellular networks, wireless networks (e.g., Wi-Fi) and/or wired networks, as well as close-range communications such as Bluetooth®, Bluetooth® low energy, or the like.

In the illustrated example, centralized load planning system 1304, the drive unit computing device 1306, and the other computing device(s) 1310 include one or more processors 1314(1), 1314(2), 1314(3) (collectively processor(s) 1314), at least one memory 1316(1), 1316(2), 1316(3) (collectively memory 1316), one or more input/output (I/O) interfaces 1318(1), 1318(2), 1318(3) (collectively I/O interface(s) 1318), one or more network interfaces 1320(1), 1320(2), 1320(3) (collectively network interface(s) 1320). Each processor 1314 may include multiple processors and/or a processor having multiple cores. Further, the processor(s) 1314 may comprise one or more cores of different types. For example, the processor(s) 1314 may include application processor units, graphic processing units, and so forth. In various examples, the processor(s) 1314 may include one or more microprocessors, microcomputers, microcontrollers, digital signal processors, central processing units, state machines, logic circuitries, and/or any devices that manipulate signals based on operational instructions. In some examples, the processor(s) 1314 may include one or more hardware processors and/or logic circuits of any suitable type specifically programmed or configured to execute the algorithms and processes described herein. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1002 may possess its own local memory, which also may store program components, program data, and/or one or more operating systems.

In some examples, the processor(s) 1314 may be configured to fetch and execute computer-readable processor-executable instructions stored in the memory 1316. Depending on the configuration of the centralized load planning system 1304, the drive unit computing device 1306, and the other computing device(s) 1310, the memory 1316 may be an example of tangible non-transitory computer storage media and may include volatile and nonvolatile memory and/or removable and non-removable media implemented in any type of technology for storage of information such as computer-readable processor-executable instructions, data structures, program modules or other data. Such memory 1316 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 1316 may be implemented as computer-readable storage media ("CRSM"), which may be any available physical media accessible by the processor(s) 1314 to execute instructions stored on the memory 1316. In some examples, CRSM may include random access memory ("RAM") and Flash memory. In other examples, CRSM may include, but is not limited to, read-only memory ("ROM"), electrically erasable programmable read-only memory ("EEPROM"), or any other tangible medium which can be used to store the desired information, and which can be accessed by the processor(s) 1314.

The memory 1316 may be used to store and maintain any number of functional components that are executable by the processor 1314. In some examples, these functional components comprise instructions or programs that are executable by the processor 1314 and that, when executed, implement operational logic for performing the actions and services attributed above to the centralized load planning system 1304, the drive unit computing device 1306, and the other computing device(s) 1310. Functional components of the centralized load planning system 1304, the drive unit computing device 1306, and the other computing device(s) 1310 stored in the memory 1316(1), and 1316(2), and 1316(3) may include applications 1322(1), 1322(2), and 1322(3) (collectively applications 1322). The applications 1322 may configure the respective devices to perform functions described herein such as with regard to FIGS. 1-12.

The functional components of the centralized load planning system 1304, the drive unit computing device 1306, and the other computing device(s) 1310 stored in the memory 1316(1), and 1316(2), and 1316(3) may additionally include operating systems 1324(1), 1324(2), and 1324(3), respectively (collectively operating systems 1324). The operating system(s) 1324 for controlling and managing various functions of the centralized load planning system 1304, the drive unit computing device 1306, and the other computing device(s) 1310. The memory 1316 may also store other modules and data, which may include programs, drivers, etc., and the data used or generated by the functional components, to enable efficient and effective food order processing. Further, the centralized load planning system 1304, the drive unit computing device 1306, and the other computing device(s) 1310 may include many other logical, programmatic and physical components, of which those described are merely examples that are related to the discussion herein. In addition, the memory 1316 may also store data, data structures and the like, that are used by the functional components.

The I/O interface(s) 1318, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 1320 may include one or more interfaces and hardware components for enabling communication with various other devices over the network or directly.

In various examples, the drive unit computing device may additionally include one or more drive systems 1326. The drive system(s) 1326 may enable the drive unit 1308 to operate throughout a second floor of a transfer facility and/or a portion of a first floor of the transfer facility, such as second portion 110. The drive system(s) may control a velocity and/or a trajectory of the drive unit(s) 1308. In various examples, the drive system(s) 1326 may receive data from one or more sensors and/or data embedded in, etched into, painted on, or otherwise displayed on an and/or proximate to an operating surface of the drive unit 1308. In various examples, the drive system(s) 1326 may be configured to determine a path and/or navigate the path between locations in the transfer facility.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a first floor of a transfer facility comprising:
      a first surface comprising:
         a first portion configured to facilitate movement of a unit load device (ULD) across the first surface of the first floor between a first location associated with an air cargo station, a second location associated with a conveyor loading station, and a third location associated with a consolidation station; and
         a second portion configured for at least one of a drive unit or a human powered vehicle to operate for delivering a ground shipment container between a fourth location associated with a ground cargo station, a fifth location associated with the conveyor loading station, and a sixth location associated with the consolidation station;
      a plurality of consolidation stations, wherein the consolidation station of the plurality of consolidation stations is configured for consolidating packages based on a destination and a mode of transportation associated with the packages, wherein the consolidation station comprises at least one of the ULD or the ground shipment container;
   a first-to-second floor conveyor configured to transport one or more packages from the conveyor loading station on the first floor to a second floor of the transfer facility;
   the second floor comprising:
      a plurality of drive units configured to carry a package across a second surface of the second floor;
      a plurality of induction stations configured for:
         receiving a package;
         determining the destination and the mode of transportation associated with the package;
         identifying a chute corresponding to the consolidation station configured to consolidate packages bound for the destination via the mode of transportation, wherein a first end of a slide is located at the chute and a second end of the slide is located at the consolidation station; and
         causing a drive unit of the plurality of drive units to deliver the package to the consolidation station via the chute, wherein based on an insertion of the package into the chute, the package travels on the slide to the consolidation station for consolidation into the at least one of the ULD or the ground shipment container.

2. The system of claim 1, wherein the first portion comprises at least one of:
   ball decking comprising first omni-directional balls powered by at least one motor and configured to facilitate movement of the ULD;
   roller decking comprising first bi-directional rollers powered by the at least one motor and configured to facilitate the movement of the ULD;
   non-powered ball decking comprising second omni-directional balls configured to facilitate the movement of the ULD;
   non-powered roller decking comprising second bi-directional rollers configured to facilitate the movement of the ULD; or
   caster wheel decking comprising wheels coupled to rotating casters configured to facilitate the movement of the ULD.

3. The system of claim 1, wherein a plurality of markings are etched into, painted on, or embedded within the second portion, wherein the drive unit and the human powered vehicle are configured to navigate the second portion based on the plurality of markings.

4. The system of claim 1, wherein the second floor further comprising a horizontal conveyor configured to transfer the packages from a conveyor unloading station on the second floor associated with the first-to-second floor conveyor to an induction station of the induction stations.

5. A method comprising:
   determining that a first container at a first location on a first floor of a transfer facility comprises one or more packages bound for one or more destinations;
   causing the first container to be delivered to a second location on the first floor associated with a conveyor configured to deliver packages from the first floor to a second floor of the transfer facility, wherein the first container is delivered to the second location via a first flooring, the first flooring configured for at least one of: facilitating movement of a unit load device (ULD), operation of a first drive unit, or operation of a human powered vehicle;
   causing a package of the one or more packages to be delivered to the second floor via the conveyor;
   causing a package to be delivered to an induction station located on the second floor, wherein a computing device at the induction station is configured to determine a destination associated with the package;
   identifying an opening through a bottom surface of the second floor, wherein the opening corresponds to a consolidation station configured for consolidating packages into a second container bound for the destination;
   causing a second drive unit to deliver the package to the consolidation station via the opening; and
   causing the package to be placed in the second container bound for the destination.

6. The method of claim 5, further comprising:
   determining that the second container is at capacity; and
   causing the second container to be delivered to a loading station via a second flooring, the second flooring configured for the other of the at least one of: facilitating movement of the ULD or the operation of the first drive unit and the human powered vehicle.

7. The method of claim 5, further comprising:
   determining that a second package at the second location comprises at least one of a height, a width, or a length that exceeds a threshold value;
   determining a second destination associated with the second package;

identifying a second consolidation station corresponding to the second destination; and causing the second package to be delivered to the second consolidation station via a third drive unit.

8. The method of claim 5, further comprising:

determining that a third container at the first location on the first floor of the transfer facility comprises one or more second packages bound for a second destination via a first mode of transportation, wherein the third container is configured for transportation via a second mode of transportation;

identifying a second consolidation station associated with the second destination and the first mode of transportation; and causing the third container to be delivered to the second consolidation station across the first flooring or the second flooring.

9. The method of claim 5, wherein the first container is configured for a first mode of transportation, the method further comprising:

determining that a third container at the first location on the first floor of the transfer facility comprises one or more second packages bound for a second destination via the first mode of transportation, wherein the third container is configured for the first mode of transportation; and causing the third container to be moved to a second loading station associated with the first mode of transportation.

10. The method of claim 5, wherein the conveyor is a first conveyor and wherein the package is delivered to the induction station via at least one of:

a third drive unit;

the first conveyor, wherein the first conveyor is further configured to deliver packages across the second floor;

a second conveyor;

an unmanned aerial vehicle; or a package loader.

11. The method of claim 5, further comprising:

determining a package backlog associated with a plurality of induction stations;

determining that the induction station has an associated package backlog below a threshold amount; and identifying the induction station for processing the package on the second floor, wherein causing the package to be delivered to the induction station is based at least in part on identifying the induction station for processing the package.

12. The method of claim 5, further comprising:

determining a mode of transportation associated with the package, wherein the consolidation station and the second container are identified based at least in part on the mode of transportation.

13. The method of claim 5, wherein:

the first container comprises at least one of a ULD configured for air transportation or a ground shipment container configured for ground transportation; and the second container comprises the other of the ULD configured for air transportation or the ground shipment container configured for ground transportation.

14. A method comprising:

determining that a first container configured for a first mode of transportation at a first location of a transfer facility comprises one or more packages to be transported to a destination via a second mode of transportation;

identifying a consolidation station associated with the destination and the second mode of transportation, wherein the consolidation station is configured for consolidating packages into a second container for transport to the destination via the second mode of transportation;

causing the first container to be delivered to the consolidation station via a first flooring, the first flooring configured for at least one of: facilitating movement of a unit load device (ULD), an operation of a drive unit, or an operation of a human operated vehicle;

determining that at least a portion of the one or more packages have been placed into the second container configured for the second mode of transportation;

determining that the second container is at capacity; and causing the second container to be delivered to a loading station via a second flooring, the second flooring configured for the other of the at least one of: facilitating movement of the ULD, the operation of the drive unit, or the operation of the human powered vehicle.

15. The method of claim 14, wherein:

the first container comprises a unit load device configured for air transportation;

the unit load device is delivered to the consolidation station via at least one of ball decking or roller decking;

the second container comprises a ground shipment container configured for ground transportation; and the ground shipment container is delivered to the loading station via the drive unit or the human operated vehicle.

16. The method of claim 14, wherein:

the first container comprises a ground shipment container configured for ground transportation;

the ground shipment container is delivered to the consolidation station via the drive unit or the human operated vehicle;

the second container comprises a unit load device configured for air transportation; and the unit load device is delivered to the consolidation station via at least one of ball decking or roller decking.

17. The method of claim 14, wherein determining that the second container is at capacity comprises:

receiving one or more package characteristics associated with at least one package placed into the second container;

determining one or more container characteristics associated with the second container based at least in part on the one or more package characteristics; and determining that a container characteristic of the one or more container characteristics is at or within a threshold amount of a maximum value associated with the container characteristic.

18. The method of claim 14, further comprising:

determining that a second container configured for the first mode of transportation at the first location of the transfer facility comprises a second plurality of packages to be transported to the destination via the first mode of transportation; and causing the second container to be delivered to a second location via the first flooring or the second flooring, wherein the second location is associated with a cargo loading station.

19. The method of claim 14, further comprising:

determining that a second container configured for the first mode of transportation at the first location comprises one or more second packages to be transported to one or more destinations;

causing the second container to be delivered to a second location on a first floor of the transfer facility, the second location being associated with a conveyor configured to deliver the one or more second packages from the first floor to a second floor of the transfer facility;

causing a package of the one or more second packages to be delivered to the second floor via the conveyor;

causing the package to be delivered to an induction station located on the second floor, wherein a computing device at the induction station is configured to determine that the package is associated with the destination;

identifying a chute associated with the destination, wherein the chute comprises an opening through a bottom surface of the second floor and wherein the chute corresponds to the consolidation station;

causing a drive unit to deliver the package to the consolidation station via the chute; and causing the package to be placed in the second container bound for the destination.

20. The method of claim 14, further comprising:

determining that a time interval between a first time associated with the second container being at capacity and a second time associated with processing the second container at the loading station;

determining that the time interval is equal to or greater than a threshold time interval;

causing the second container to be stored in a temporary storage location; and determining that a current time corresponds to the second time, wherein causing the second container to be delivered to the loading station via the second flooring is based at least in part on the current time corresponding to the second time.

* * * * *